(12) United States Patent
Houghton

(10) Patent No.: US 7,255,327 B2
(45) Date of Patent: Aug. 14, 2007

(54) SYSTEMS AND METHODS PROVIDING HANDS FREE WATER FAUCET CONTROL

(76) Inventor: Harmon Houghton, 823 Don Diego, Santa Fe, NM (US) 87505

( * ) Notice: Subject to any disclaimer, the term of this patent is extended or adjusted under 35 U.S.C. 154(b) by 6 days.

(21) Appl. No.: 10/456,085

(22) Filed: Jun. 6, 2003

(65) Prior Publication Data
US 2004/0200987 A1 Oct. 14, 2004

Related U.S. Application Data

(60) Provisional application No. 60/461,922, filed on Apr. 10, 2003.

(51) Int. Cl.
*F16K 31/00* (2006.01)
*F16K 11/087* (2006.01)
*F16K 11/085* (2006.01)

(52) U.S. Cl. ............ 251/295; 137/625.41; 137/625.47; 4/676

(58) Field of Classification Search ................ 251/286, 251/287, 295; 137/625.16, 625.41, 625.47; 4/676, 677
See application file for complete search history.

(56) References Cited

U.S. PATENT DOCUMENTS 5,507,314 A * 4/1996 Knapp .................. 137/625.41
5,941,504 A * 8/1999 Toma et al. ................ 251/295
6,067,675 A * 5/2000 Boyette ........................ 4/677

* cited by examiner

*Primary Examiner*—Eric Keasel
*Assistant Examiner*—Andrew J. Rost
(74) *Attorney, Agent, or Firm*—Philip D. Askenazy; Peacock Myers, P.C.

(57) ABSTRACT

Hands free system providing user control and regulation of water flow and temperature mix using "foot actuated" devices. Hands free system is adaptable to pre-existing water faucets and conventional plumbing, enabling full integration of an adjustable foot operated device with conventional hand operated water faucets. The hand free water system includes a control state module for providing a user with BYPASS, ON, OFF, HOT and COLD modes of operation. Hardware can include a sealed chamber body adapted for containing a mixing ball valve and having chamber ports further serving as internal passages to channels adapted to said sealed chamber body for connection to water line tubing. The mixing ball can include delivery and exit ports through which water can enter and exit and is adapted for rotation in relation to the fixed chamber body for selective alignment with said chamber ports. A foot controllable actuator in operational connection with said mixing ball valve, wherein rotation of said mixing ball valve with said foot controllable actuator offer user over control water flow rate and temperature.

13 Claims, 17 Drawing Sheets

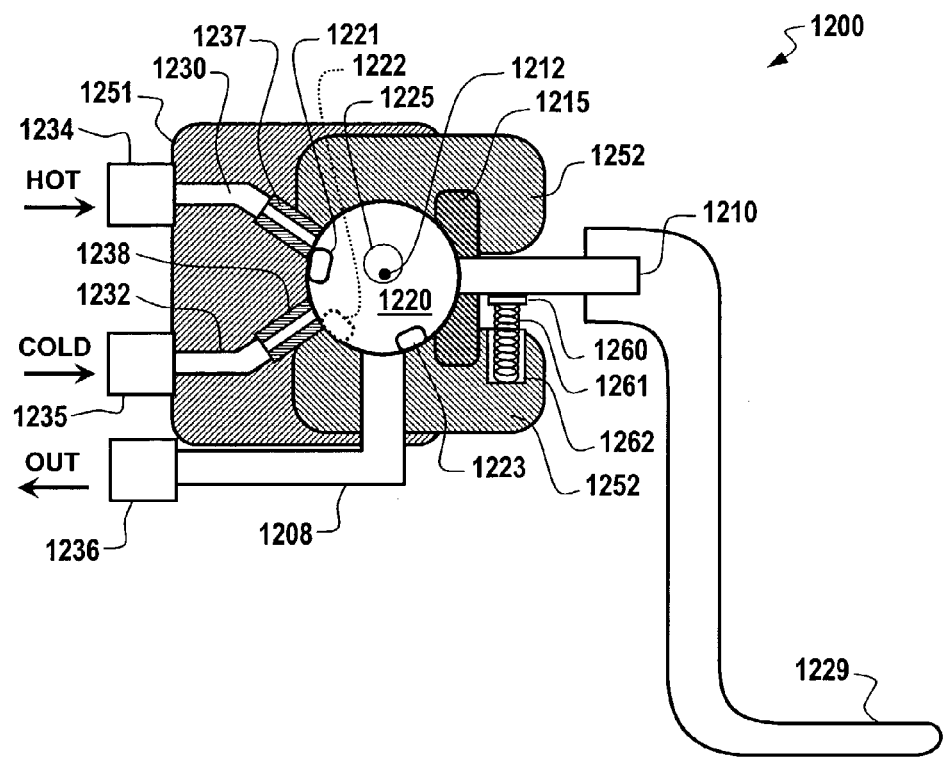
*Figure 12A*
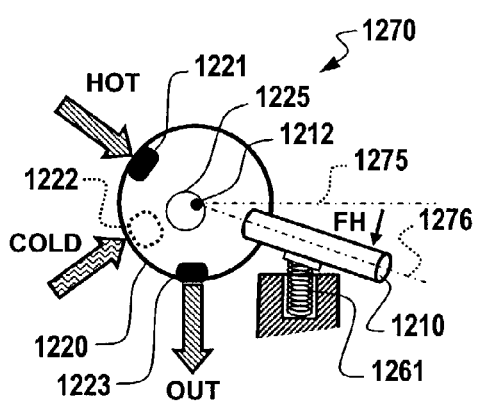 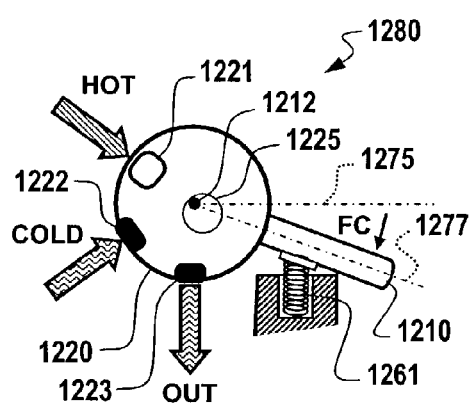
*Figure 12B*  *Figure 12C*

SYSTEMS AND METHODS PROVIDING HANDS FREE WATER FAUCET CONTROL

APPLICATION PRIORITY

This patent application claims priority to provisional patent application No. 60/461,922, filed Apr. 10, 2003, entitled "SYSTEMS AND METHODS PROVIDING HANDS FREE WATER FAUCET CONTROL."

TECHNICAL FIELD OF THE INVENTION

The field of the present invention generally relates to systems and methods for controlling and regulating water flow and temperature mix using "hands free" devices in conjunction with conventional water faucets. The present invention more particularly relates to the integration of an adjustable foot operated device with conventional hand operated water faucets.

BACKGROUND OF THE INVENTION

Traditional sinks and basins typically are equipped with "hand operated" faucets to provide a means of controlling flow rate and temperature mix of water used in a vast number of situations and applications. Flow rate and temperature mix adjustments require the use of the user's hands to manipulate faucet valves, or other mechanisms such as levers, or joysticks to control any desired output settings. In the use of conventional hand operated faucets, the single user must free, at minimum, one hand in order to manipulate the faucet control mechanism. This conventional use restricts the single user, in certain situations, full use of both hands to perform secondary operations while simultaneously controlling the faucet output.

In applications that require full use of both hands, the single user is subject to an initial presetting of the faucet output controls to the desired setting. Meanwhile, during the adjustment phase, water is flowing continuously and for a period while the user prepares and engages in the secondary operation. For example, in initial conditions where both hands are contaminated and is undesirable to spread the contamination to the faucet controls, the single user must rely on secondary measures to manipulate conventional faucet valves and mechanisms to initiate the desired output. Similarly, in post conditions where both hands have been thoroughly scrubbed and free of contamination and is undesirable to contract any contamination by direct hand contact with the faucet controls, the single user must rely on secondary measures to shut off the faucet output.

For the examples cited above, along with a vast number of similar applications, there is an increased interest in a "hands free" faucet control system. Currently, a number of "hands free" devices exist that are capable of being configured in-line or in series with existing supply lines to conventional faucets. Typically, "hands free" devices feature remote mechanical or electrical linkage control of activating the supply lines to conventional faucets. Some known methods of activation of "hands free" devices include direct foot pressure; body leaning against a plate or bar; use of proximity electronic sensor; voice activation system; and timer devices.

The common control feature of known activation methods, however, is their dependence on a fixed preset condition of the conventional faucet for the delivery of the desired flow rate and temperature mix. As a result, the user must initially configure a conventional faucet to a predetermined flow rate and temperature mix setting, then assert the "hands free" activation device to deliver the output. Any adjustments to the flow rate and temperature mix, before or during operation, are manual and require use of hands to manipulate the conventional faucet controls, as before.

The inconvenience of setting flow rates and temperature mixes prior, during, and possibly after an operation increase when requirements of an operation demand sequentially setting of different rates and mixes. Further complications arise when two or more users have access to the same delivery system and an individual assumes the status of the systems' presets to be in accordance to their particular setting. An incorrect assumption, on the part of an individual on the present state of that system, may result in personnel or product safety issues. Furthermore, waste of clean water during the normal set-up of the initial conditions, plus the energy expended in the heating and possible conditioning of the water should also be a concern. Furthermore, the waste of clean water and energy resources only increases in a multi-user scenario.

What is needed are effective means or methods to resolve the problem explained above so that a single user of a conventional faucet can readily configure a system to deliver a desired variable water rate and temperature mix via normal conventional "hand operated" controls and/or via a remote "hands free" control device. In conjunction with the selection of either mode of operation, the present state of the system output controls are always visible and accessible by the user throughout system operation. The present inventor has recognized that it would be advantageous to remedy the foregoing and other deficiencies in the prior art, and to facilitate the operation and production of a "hands free" control device by introducing and conforming to standard known methods and features used in existing water valves systems.

SUMMARY OF THE INVENTION

The following summary of the invention is provided to facilitate an understanding of some of the innovative features unique to the present invention, and is not intended to be a full description. In accordance with one aspect of the invention, the recess or cavity for the installation of the mixing ball valve is in a fixed chamber component of the remote device and attached to the enclosure of the "hands free" device. The heart of the adjustment feature of the "hands free" control mechanism is the relationship and operation of the mixing ball valve with respect to a fixed chamber body. The mixing ball valve rotates in relation to the fixed body of the chamber and pivots about a keyed slot on the mixing ball valve and limited in rotation by a corresponding fixed orientation pin within the cavity of the chamber.

Flow rate and temperature mixture is a function of the orientation of delivery and exit ports of the mixing ball valve relative to the chamber ports. Preferably, the "hands free" device employs a mixing ball valve of the open type, offering lateral delivery ports. That component in which the orientation for the mixing ball valve is predetermined features a peripheral area into which the delivery ports of the mixing ball valve and the exit ports of the chamber body communicate directly with an internal passage of the output channel.

In accordance with a feature of the present, the flow of water in the operational mode is via standard plumbing interconnections. Using standard interconnections, cold and hot water supplies enter the mixing ball valve via the internal passages and ports within the chamber body and enter the ball valve via entrance ports on the ball valve, directly. To facilitate control and regulation of the rotating mixing ball valve, an extension to a fixed lever attached to the ball valve extends to the user in the form of a foot pedal. Delivery of the output mixture exits the mixing ball valve via an output port and through a corresponding internal passage within the chamber body. The chamber output channel features standard plumbing connections that interface to existing plumbing fixtures connecting the conventional faucet that presents the output mixture.

In accordance with yet another feature of the present invention, the "hands free" device features a "BYPASS" state, which places the mixing ball valve's orientation in the maximum flow rate of hot water, only. Since the output channel of the chamber body assembly and mixing ball valve is in an in-line supply or series arrangement with the conventional faucet's corresponding "hot water" control valve, assertion of the "hands free" device in the "BYPASS" state provides a single source of supply of hot water to the conventional faucet. The cold water is in a constant supply or parallel arrangement to both the "cold water" input channel of the chamber body and to the conventional faucet's corresponding "cold water" control valve. The purpose of the "BYPASS" state, is to allow the user full "hand operated" control of the output via the conventional faucet control valves.

In accordance with yet another feature of the present invention, to engage the "hands free" device, while in the "BYPASS" state, the user must manually adjust the conventional faucet's "hot water" valve to the desired maximum flow rate. Upon the manually setting of the desired flow rate, the user engages the "hands free" device by switching from the "BYPASS" state to any of the four states, "OFF", "ON", "HOT", or "COLD", by use of the foot pedal. The definition of the "OFF" state is the "hands free" device is in an operational mode and water output is shut-off. Similarly, in the "ON", "HOT", and "COLD" variable states, the "hands free" device is an operational mode and by use of the foot pedal, the user may vary the flow rate and temperature mix, accordingly.

Also in accordance with addressing the limitations of the prior art, presented are new and improved methods of asserting and controlling the "hands free" device to regulate the flow rate and temperature mix. The present invention features a systematic and a straightforward approach to presetting the "hands free" device that are both ergonomic and economic. In addition to the benefits of the convenience of the "hands free" feature of the device, the ease of operation and cost of ownership are prime factors in the solution of reducing the waste of clean water and associated energy resources.

In a preferred embodiment, a hands free system provides user control and regulation of water flow and temperature mix using "foot actuated" devices. The hands free system is preferably adaptable to pre-existing water faucets and conventional plumbing, enabling full integration of an adjustable foot operated device with conventional hand operated water faucets. The hand free water system can include a control state module for providing a user with BYPASS, ON, OFF, HOT and COLD modes of operation. Hardware can include a sealed chamber body adapted for containing a mixing ball valve and having chamber ports further serving as internal passages to channels adapted to said sealed chamber body for connection to water line tubing. The mixing ball can include delivery and exit ports through which water can enter and exit and is adapted for rotation in relation to the fixed chamber body for selective alignment with said chamber ports. A foot controllable actuator in operational connection with said mixing ball valve, wherein rotation of said mixing ball valve with said foot controllable actuator offer user over control water flow rate and temperature. Other aspects and features of the present invention will be appreciated by those skilled in the art after full review of the detailed descriptions, associated drawings, and the appended claims.

BRIEF DESCRIPTION OF THE DRAWINGS

The accompanying figures, in which like reference numerals refer to identical or functionally similar elements throughout the separate views and incorporation within and from part of the specification, further illustrate the present invention and, together with the detailed description of the invention, serve to explain the principles of the present invention.

FIG. 12A is an exemplary sectional side view of a "hands free" device in the "OFF" state position and further illustrating a bottom spring loading of a mechanical reset feature, in accordance with an embodiment of the present invention;

FIG. 12B is an exemplary sectional side view of a mixing ball valve in the "COLD" state position and further illustrating deflection limits of a bottom spring mechanical reset feature, in accordance with an embodiment of the present invention;

FIG. 12C is an exemplary sectional side view of a mixing ball valve in the "HOT" state position and further illustrating deflection limits of a bottom spring mechanical reset feature, in accordance with an embodiment of the present invention;

DETAILED DESCRIPTION OF THE INVENTION

The novel features of the present invention will become apparent to those of skill in the art upon examination of the following detailed description of the invention or can be learned by practice of the present invention. One must understand, however, that the detailed description of the invention and the specific examples presented, while indicating certain embodiments of the present invention, are provided for illustration purposes, only. Due to various changes and modifications within the scope of the invention, the intent of the invention will become apparent to those of skill in the art from the detailed description of the invention and claims that follow.

Use of "hands free" devices in conjunction with conventional faucets of all types has proven to be very useful and effective in a vast number of applications, but existing devices do not offer a readily configurable system that can deliver a desired variable water rate and temperature mix via a remote "hands free" control device. Another issue in the implementation of existing "hands free" devices resides in the difficulty of the user to determine the present state of the system control settings without inconveniencing the user and exposing the user to possible hazardous conditions. The present invention alleviates these deficiencies in the manner of introducing new and improved methods of asserting and controlling the "hands free" device to regulate the flow rate and temperature mix. Coupled with conforming to standard known methods and features used in existing water valve systems plus the introduction of a systematic and a straightforward approach to presetting the "hands free" device, the benefits of the present invention pose a positive ergonomic effect. In addition to the benefits of convenience and the ease of use of the present invention, the economic benefits in the savings of reducing the waste of clean water and associated energy resources are positive and practical considerations in the use of this device.

FIGS. 1A through 4B (all identified as prior art) provide a general background and as benchmarks in the evolutionary improvements of flow rate control and regulation methods and mechanisms leading to the innovation of the present invention. Each graphical illustration in this series depicts an exemplary external view of a form of embodiment of conventional systems and each subsequent Figure represents the functional details, schematically.

Figure 1A:
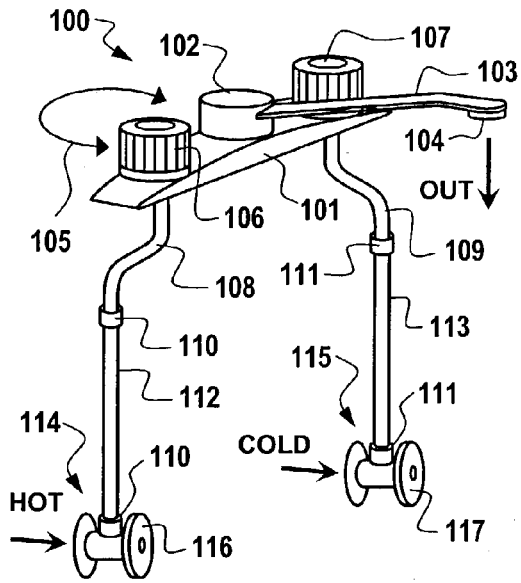
FIG. 1A illustrates an exemplary external view of a form of embodiment of a "two valve" conventional faucet configured with service shut-off valves, in accordance with prior art.

Referring to FIG. 1A, a graphical illustration depicts a basic "two valve" conventional faucet 100 configured with service shut-off valves 114 and 115. A basic "two valve" conventional faucet 100 has a fixed base 101 on which is mounted a mixing chamber 102 which forms a delivery spout 103 and output port 104. Mixing chamber 102 can be in the form of a rotating or a fixed component in relation to the fixed base 101. A manual control "hot water" knob 106 and "cold water" knob 107 correspond with internal valves (not shown) and passages (not shown) integral to the fixed base 101. Control knobs 106 and 107 provide the user "hand operated" or manual control of the flow rate of hot and cold water to the mixing chamber 102. Rotation in either direction 105 about the axis of each of the control knobs 106 and 107 provides a basic form of regulation of the variable flow rate and the mixing ratio between hot and cold water. Predetermined stop limits for a CLOSED state and an OPEN state are integral functions of these internal valves (not shown). Also, integral to the internal valves, are a fixed "hot water" line 108 and "cold water" line 109 that serve as input ports to their respective valves (not shown). Fixed water lines 108 and 109 interconnect with sources of HOT and COLD water. In the basic configuration shown in FIG. 1A, fixed "hot water" line 108 interconnects with the HOT water supply via standard plumbing components consisting of couplers 110, water line 112, and "hot water" service shut-off valve 114. Similarly, fixed "cold water" line 109 interconnects with the COLD water supply via plumbing components consisting of couplers 111, water line 113, and "cold water" service shut-off valve 115. In normal operational configurations, service shut-off valves 114 and 115 are set to an OPEN state by adjustment of control knobs 116 and 117.

Figure 1B:
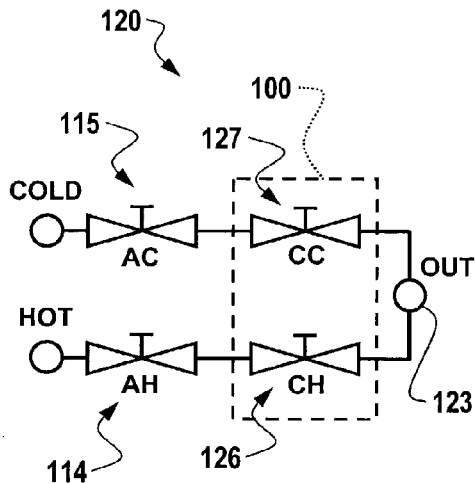
FIG. 1B illustrates a schematic representation of an interconnection of a "two valve" conventional faucet with service shut-off valves, in accordance with prior art.

Referring to FIG. 1B, a graphical illustration depicts a schematic representation 120 of the basic "two valve" conventional faucet 100 and service shut-off valves 114 and 115 configuration, as graphically illustrated in FIG. 1A. In this basic configuration, the logical path of hot water flow begins with the presentation of hot water from the HOT water source to the input port of the "hot water" shut-off valve 114. The output port of the "hot water" shut-off valve 114, in turn, connects with the input port of the "hot water" valve 126 of the "two valve" conventional faucet 100 and presents the hot water to the OUT port 123. In a similar series arrangement, the logical path of cold-water flow begins at the COLD water source; through the "cold water" shut-off valve 115; through the "cold water" valve 127; and outputs at the OUT port 123. The schematic representation 120 illustrates the independent regulation control of each of the valves 126 and 127, and the mixing component as convergence of outputs at OUT 123. A deficiency of this independent control scheme becomes evident with an operation that requires simultaneous adjustment of both valves 126 and 127. For these situations, the single user must use both hands to manipulate the two valves 126 and 127. To alleviate the deficiency of the independent control of the "two valve" conventional faucet 100, use of a design of a "single lever" conventional valve 150, as illustrated in FIG. 1C, is considered.

Figure 1C:
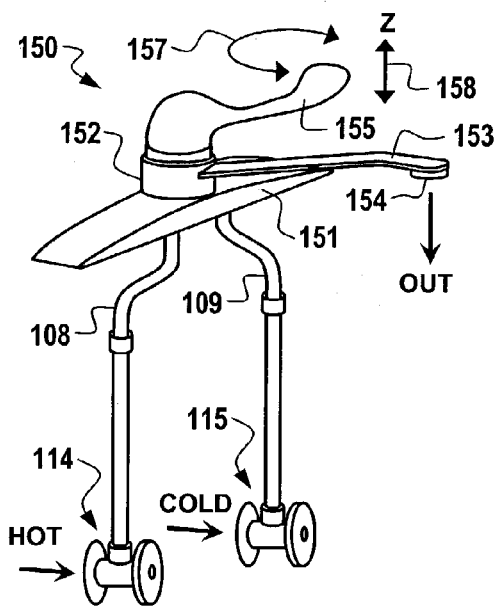
FIG. 1C illustrates an exemplary external view of a form of embodiment of a "single lever" conventional faucet configured with service shut-off valves, in accordance with prior art.

Referring to FIG. 1C, a graphical illustration depicts a basic "single lever" conventional faucet 150 configured with service shut-off valves 114 and 115. In principle, the functions of a basic "two valve" conventional faucet 100 and a "single lever" conventional faucet 150 are similar. Common to both faucets 100 and 150 are that a "single lever" conventional faucet 150 has a fixed base 151 on which is mounted a chamber body 152 which forms a delivery spout 153 and output port 154. Likewise, the chamber body 152 can be in the form of a rotating or a fixed component in relation to the fixed base 151. However, a manual control lever 155 corresponds with a single internal valve (not shown) and passages (not shown) integral to the fixed base 151. Control lever 155 provides the user manual or "hand operated" and simultaneous control of the flow rate of hot and cold water to the chamber body 152. Rotation in either direction 157 about the axis of the chamber body 152 provides the regulation of the mixing ratio between hot and cold water and the vertical deflection 158 adjusts the variable flow rate. Predetermined stop limits for a CLOSED state and an OPEN state are integral functions of internal valve elements (not shown). Also, integral to the internal valves, are a fixed "hot water" line 108 and "cold water" line 109 that serve as input ports to their respective valve elements (not shown). Configuration and interconnection of the "single lever" conventional faucet 150 to HOT and COLD water sources is identical to that of the "two valve" conventional faucet 100.

Figure 1D:
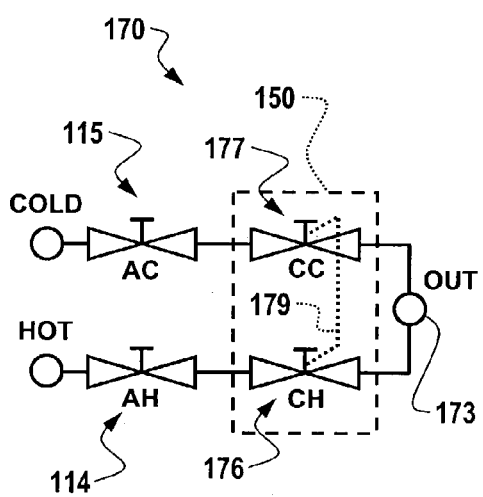
FIG. 1D illustrates a schematic representation of an interconnection of a "single lever" conventional faucet with service shut-off valves, in accordance with prior art.

Referring to FIG. 1D, a graphical illustration depicts a schematic representation 170 of the basic "single lever" conventional faucet 150 and service shut-off valves 114 and 115 configuration. In this basic configuration, the logical paths of hot and cold water flow are identical to the serial arrangement of components of the "two valve" conventional faucet 100, shown in FIG. 1B. Main difference between the two configurations 120 and 170 is the function of the linkage 179 between the "hot water" valve element 176 regulating the flow rate and temperature mix OUT 173 versus the "cold water" valve element 177 within the "single lever" conventional faucet 150. Although, the schematic representation 170, as shown in FIG. 1D, symbolically illustrates linkage between two independent valve elements 176 and 177, the physical realization is a single mixing ball valve 220, as shown in FIG. 2.

Figure 2:
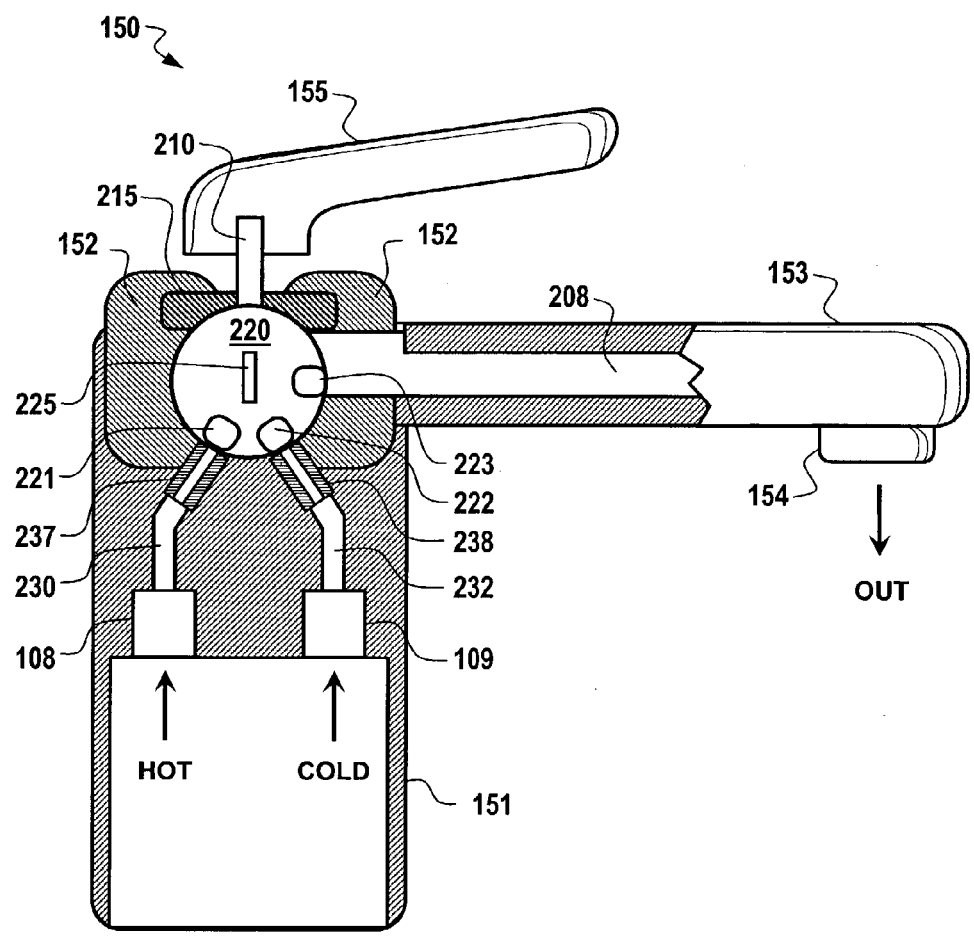
FIG. 2 illustrates an exemplary sectional view of a "single lever" conventional faucet, in accordance with prior art.

Referring to FIG. 2, a graphical illustration depicts an exemplary sectional view of a "single lever" conventional faucet 150 housed in fixed base 151. The "single lever" conventional faucet 150 employs a mixing ball valve 220 of the open type, offering lateral "hot water" inlet 221 and a "cold water" 222 that communicate directly with internal passages 230 and 232, respectively. The delivery outlet 223 of mixing ball valve 220 communicates directly with an output passage 208 of the delivery spout 153 and outputs via the port 154. Chamber body 152 covers and retains cam assembly 215 that guides ball valve stem 210 and maintains a water seal about mixing ball valve 220. Alignment of mixing ball stem is in relation to slot 225 that pivots about a fixed pin (not shown) within the chamber body 152 and allows restricted rotation of the mixing ball valve 220. Orientation of faucet control handle 155 is in relation to the alignment of internal drive components of the mixing ball valve 220 and chamber body 152. External input port for "hot water" 108 and "cold water" 109 interconnect directly with internal passages 230 and 232. Within the internal passages 230 and 232, are recessed "hot water" seal assembly 237 and "cold water" seal assembly 238 that form a water seal about the mixing ball valve 220.

Figure 3:
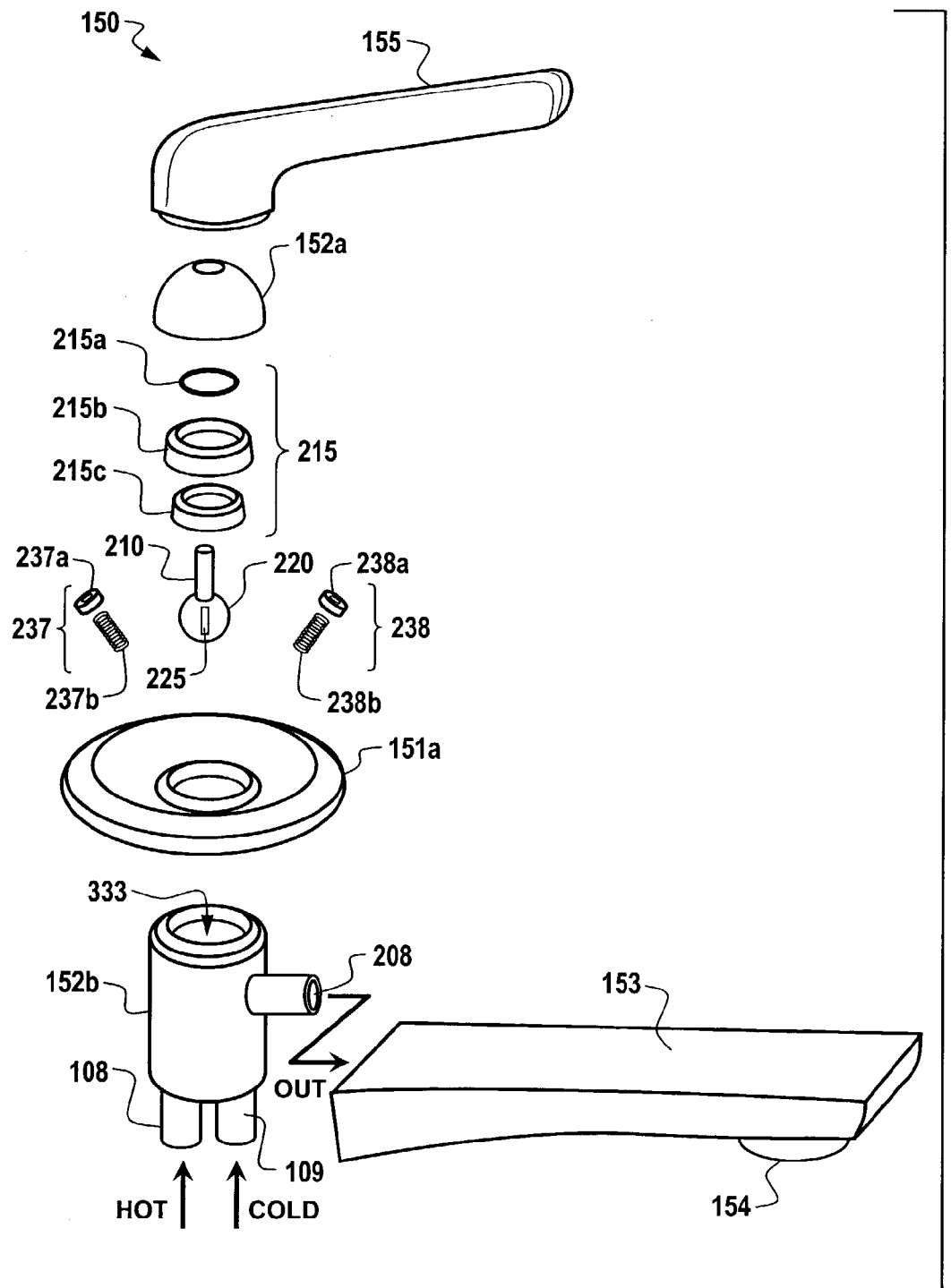
FIG. 3 illustrates an exemplary exploded view of a "single lever" conventional faucet, in accordance with prior art.

Referring to FIG. 3, a graphical illustration depicts an exemplary exploded view of the critical components of a "single lever" conventional faucet 150. The escutcheon 151a, portion of the fixed base 151 described in FIG. 2, forms the platform for securing the chamber body cover 152a unto the main chamber body 152b. The main chamber body has a chamber cavity 333 intended to receive the hot and cold water seal assemblies 237 and 238, respectively. Seat 237a and spring 237b form the "hot water" seal assembly 237 and seat 238a and spring 238b form the "cold water" seal assembly and are installed within the two recessed ports (not shown) within chamber cavity 333. Chamber cavity 333 also receives and aligns mixing ball valve 220 via slot 225 and fixed pin (not shown) within chamber cavity 333. The alignment sets orientation of mixing ball stem 210 with control handle 155. Cam assembly 215 consisting of an o-ring seal 215a, a cam 215b, and a cam bushing 215c provide a guide for the mixing ball valve stem 210 in combination with forming a water seal for the mixing ball valve 220. Hot and cold water deliveries to the main chamber body 152b are through external ports 108 and 109. Output passage 208 delivers resultant water flow and temperature mix to faucet spout 153 and outputs via the port 154.

Figure 4A:
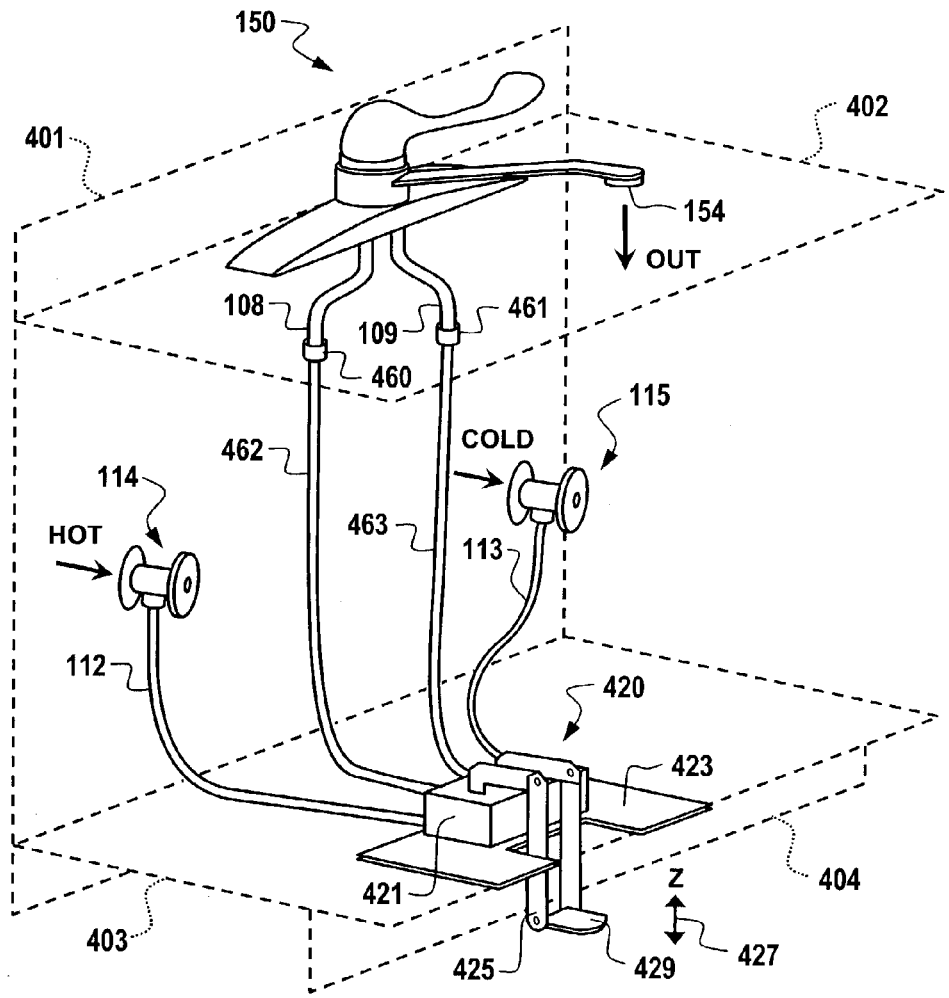
FIG. 4A illustrates an exemplary external view of a form of embodiment of a typical cabinet top installation of a "single lever" conventional faucet configured with service shut-off valves and a typical counter base installation of a "hands free" device, in accordance with prior art.

Referring to FIG. 4A, a graphical illustration depicts a basic installation of a "single lever" conventional faucet 150 configured with "hands free" faucet control system 420 and service shut-off valves 114 and 115. The top horizontal plane 402 represents a cabinet countertop support plane of a "single lever" conventional faucet 150. The bottom horizontal plane 403 represents a cabinet base support plane of a "hands free" faucet control system 420. Vertical plane 401 represents a back support plane for the cabinet and plane 404 represents a front surface plane of a baseboard. Interconnection of a "single lever" conventional faucet 150 to the "hands free" faucet control system 420 is in a logical series configuration with the HOT and COLD water supplies. A basic "hands free" faucet control system 420 has a fixed base 423 on which is mounted a valve actuator 421. Vertical deflection 427 of the combination foot pedal 429 and linkage assembly 425 provides a basic form of foot control for engaging and disengaging the valve actuator 421. Downward deflection of the foot pedal 429 activates separate hot and cold water valves (not shown), internal to valve actuator 421, from normally CLOSED state to an OPEN state. Fixed water lines 108 and 109 interconnect via couplers 460 and 461 with "hands free" faucet control's output lines 462 and 463, respectively. In the configuration shown in FIG. 4A, "hot water" input of "hands free" faucet control interconnects with the HOT water supply via water line 112, and "hot water" service shut-off valve 114. Similarly, "cold water" input of "hands free" faucet control interconnects with the COLD water supply via water line 113, and "cold water" service shut-off valve 115.

Figure 4B:
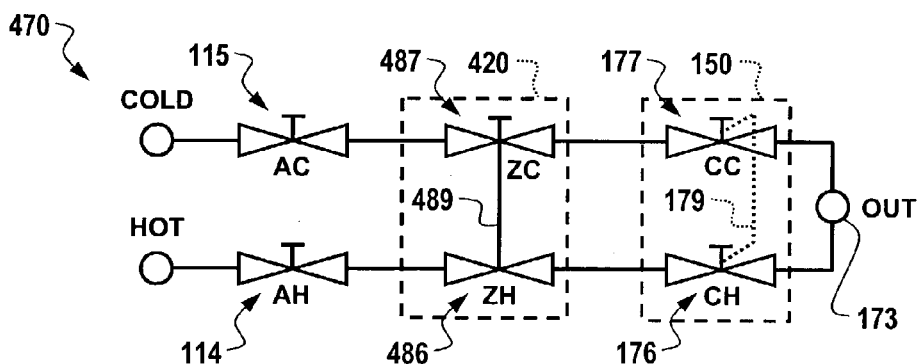
FIG. 4B illustrates a schematic representation of an interconnection of a "single lever" conventional faucet with service shut-off valves and a "hands free" device, in accordance with prior art.

Referring to FIG. 4B, a graphical illustration depicts a schematic representation 470 of the "hands free" faucet control 420 configured with a basic "single lever" conventional faucet 150 and service shut-off valves 114 and 115. The variable linkage 179 between the "hot water" valve element 176 and the "cold water" valve element 177 regulate the flow rate and temperature mix of the water OUT 173. The "hands free" faucet control 420 is depicted with fixed linkage 489 between two independent valves 486 and 487 that are activated simultaneously, as described above, and at the same flow rate.

Figure 5A:
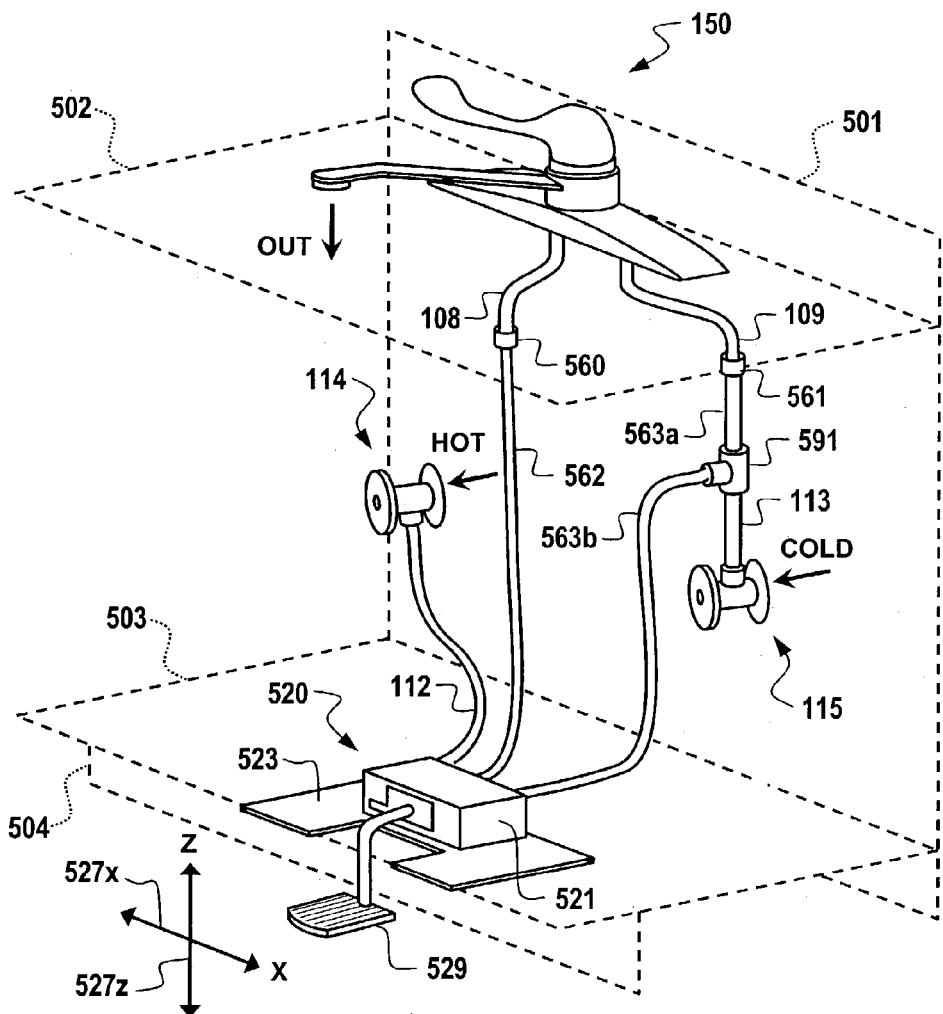
FIG. 5A illustrates an exemplary external view of a form of embodiment of a typical cabinet top installation of a "single lever" conventional faucet configured with service shut-off valves and a typical cabinet base mount of the "hands free" device, in accordance with an embodiment of the present invention.

Referring to FIG. 5A, a graphical illustration depicts a basic installation of a "single lever" conventional faucet 150 configured with "hands free" faucet control system 520 and service shut-off valves 114 and 115 in accordance with features of the present invention. The top horizontal plane 502 represents a cabinet countertop support plane of a "single lever" conventional faucet 150. The bottom horizontal plane 503 represents a cabinet base support plane of a "hands free" faucet control system 520. Vertical plane 501 represents a back support plane for the cabinet and plane 504 represents a front surface plane of a typical baseboard. Interconnection of a "single lever" conventional faucet 150 to the "hands free" faucet control system 520 is in a logical parallel and series configuration with the HOT and COLD water supplies. A basic "hands free" faucet control system 520 has a fixed base 523 on which is mounted a valve actuator 521. Vertical deflection 527z and horizontal deflection 527x of foot pedal assembly 529 provides a basic form of foot control for engaging and disengaging the valve actuator 521. Deflections of the foot pedal 529 controls the variable flow rate and temperature mix of both HOT and COLD water via a single internal valve (not shown). Fixed "hot water" line 108 interconnects via coupler 560 with "hands free" faucet control's output line 562. HOT water input connection 112 interconnects with the "hot water" input of "hands free" faucet control 520. Fixed "cold water" line 109 interconnects via coupler 561 to pipe segment. COLD water input line 113 is divided via "tee connector" 591 in a parallel arrangement via external connections 563a and 563b to conventional faucet 150 and hands free faucet control 520, respectively.

Figure 5B:
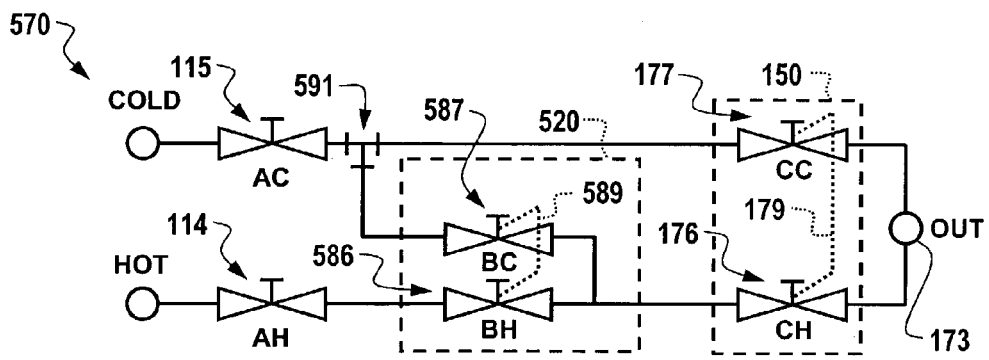
FIG. 5B illustrates a schematic representation of an interconnection of a "single lever" conventional faucet with service shut-off valves and the "hands free" device, in accordance with an embodiment of the present invention.

In operation, reference being made to FIG. 5B, a graphical illustration depicts a schematic representation 570 of the "hands free" faucet control 520 configured with a basic "single lever" conventional faucet 150 and service shut-off valves 114 and 115. Logical path of HOT water flow is the series arrangement of "shut-off" valve 114; "hot water" valve element 586 of hands free faucet control 520; and "hot water" valve element 176 of the conventional "single lever" faucet 150. Logical path of COLD water flow is the combination series and parallel arrangement of the "shut-off" valve 115; "tee" fitting 591; "cold water" valve element 587 of hands free faucet control 520; and "cold water" valve element 177 of the conventional "single lever" faucet 150. The variable linkage 179 between the "hot water" valve element 176 and the "cold water" valve element 177 regulate the flow rate and temperature mix of the water OUT 173. The "hands free" faucet control 520 is depicted with variable linkage 589 between two independent valve elements 586 and 587 that are capable of being activated simultaneously and regulate flow rates and temperature mix as described with the "hands free" faucet concept.

Figure 6A:
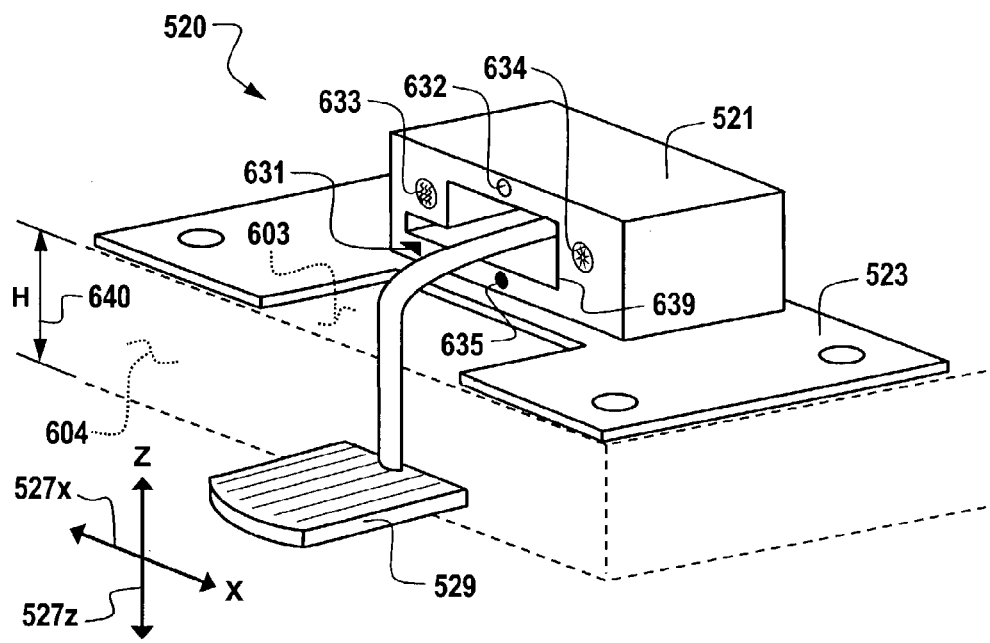
FIG. 6A illustrates an exemplary external view of a form of embodiment of a typical atop cabinet base mount of the "hands free" device, in accordance with an embodiment of the present invention.

Referring to FIG. 6A, a graphical illustration depicts a basic installation of a "hands free" faucet 520 with base 523 secured to the top side of surface 603 of platform 604. A plurality of accessories and foot pedals can be provided to interchange with the foot pedal 529 and adjust the foot pedal position in accordance to platform height H 640 and allows deflection of foot pedal 529 in the horizontal and vertical directions 527x and 527z. Adjustment and position of foot pedal 529 is critical to operational freedom of movement within valve actuator 521 operating limits in all modes of operation and within the limitation of aperture 639. Operational mode indicators BYPASS 631, OFF 632, HOT 633, COLD 634, and ON 635 indicate the relative position of foot pedal 529 and correlates with the present operational state of the "hands free" faucet 520.

Figure 6B:
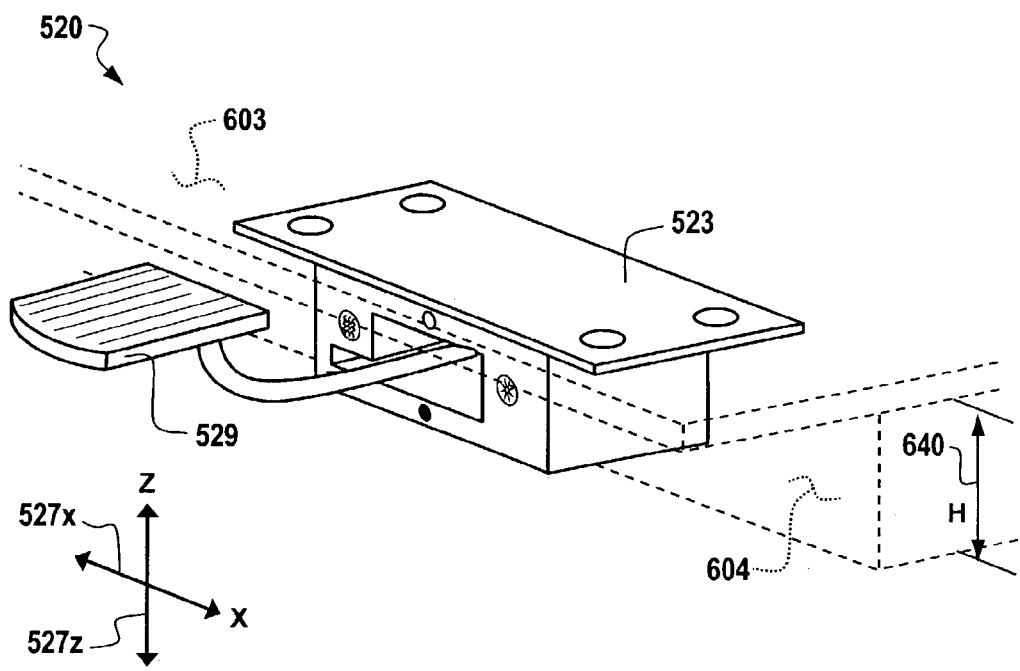
FIG. 6B illustrates an exemplary external view of a form of embodiment of a typical under cabinet base mount of the "hands free" device, in accordance with an embodiment of the present invention.

In one embodiment, FIG. 6B, an installation of a "hands free" faucet 520 with base 523 secured to the bottom surface 603 of platform 604 allowing "hands free" faucet 520 to suspend from the bottom surface 603. A version of foot pedal 529 may be adjusted to conform to platform height H 640 and allow movement of foot pedal 529 in the horizontal and vertical directions 527x and 527z, as described above.

Figure 7A:
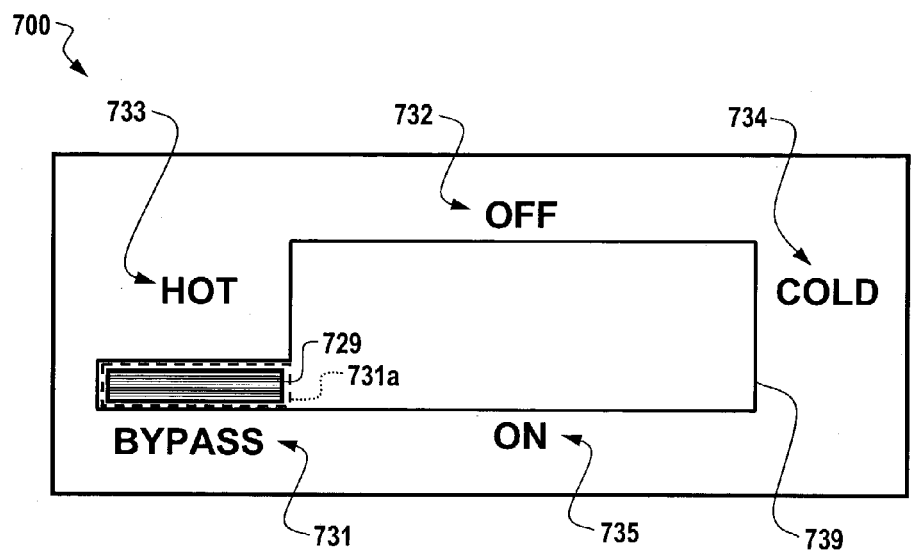
FIG. 7A illustrates a front view of a faceplate of the "hands free" device illustrating a profile of the foot pedal in the "BYPASS" state position, in accordance with an embodiment of the present invention.

In operation, reference being made to FIG. 7A, a graphical illustration depicts the front view of faceplate 700 of a "hands free" faucet 520, FIG. 5A, with aperture 739. Operational mode labels BYPASS 731, OFF 732, HOT 733, COLD 734, and ON 735 indicate the relative position of corresponding operational states of the "hands free" faucet 520, FIG. 5A. FIG. 7A further illustrates the placement of the foot pedal 729 within the operational zone 731a of the BYPASS state 731. In the BYPASS state 731, the "hands free" faucet 520, FIG. 5A, is not activated and provides the user normal use of the conventional faucet 150, FIG. 5A.

Figure 7B:
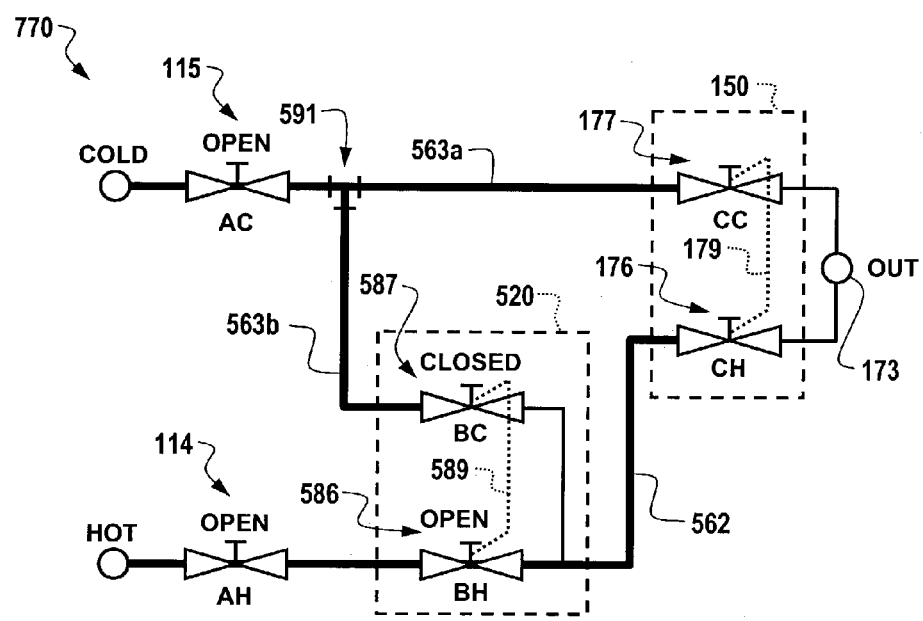
FIG. 7B illustrates a schematic representation of an interconnection of a "single lever" conventional faucet with service shut-off valves and the "hands free" device and further illustrating the presence and logical flow of water in the "BYPASS" state, in accordance with an embodiment of the present invention.

In operation, reference being made to FIG. 7B, a graphical illustration depicts a schematic representation 770 of the "hands free" faucet 520 set in the BYPASS state 731, FIG. 7A, allowing normal control of "single lever" conventional faucet 150. Water valve elements 586 and 587 of "hands free" faucet 520 are positioned or "parked" in a fixed position by linkage 589. Supply of HOT water is transferred via shut-off valve 114 and allowed to flow via a fixed OPEN "hot water" valve 586 and delivered via line connection 562 to "hot water" valve element 176. Supply of COLD water is transferred via shut-off valve 115 via tee connector 591 that diverts the COLD water supply to line connections 563a and 563b. Line connection 563a provides direct supply of COLD water to "cold water" valve element 177. In the BYPASS state 731, line connection 563b provides direct supply of COLD water to CLOSED "cold water" valve 587, and terminates at this junction. Desired flow rate and temperature mix is controlled by adjustment of valve elements 176 and 177 by linkage 179 and output via OUT port 173.

Figure 8A:
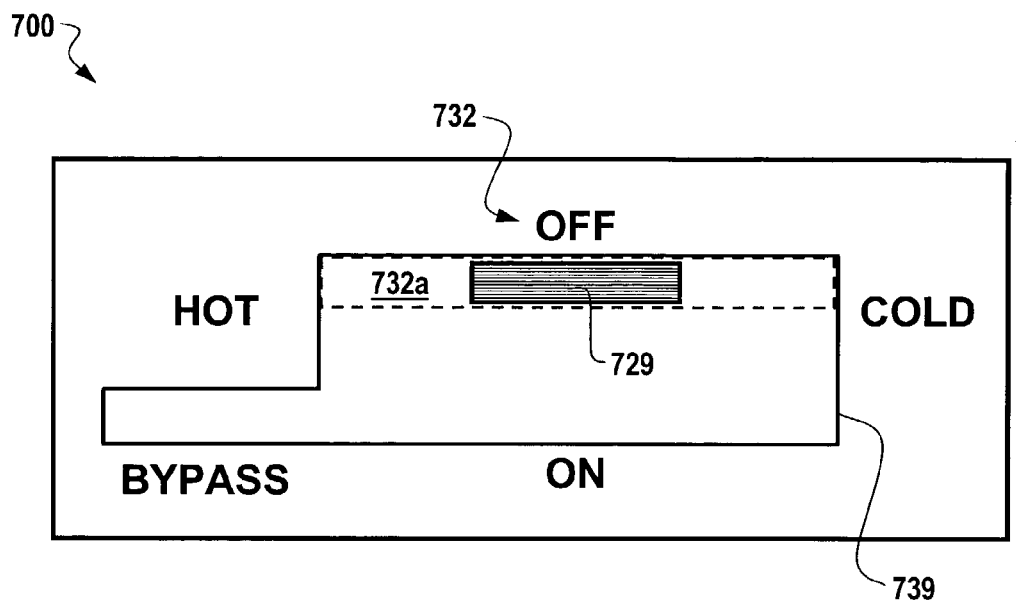
FIG. 8A illustrates a front view of a faceplate of the "hands free" device illustrating a profile of the foot pedal in the "OFF" state position, in accordance with an embodiment of the present invention.

In operation, reference being made to FIG. 8A, a graphical illustration depicts the front view of faceplate 700 of a "hands free" faucet 520, FIG. 5A, with aperture 739 and placement of the foot pedal 729 within the operational zone 732a of the OFF state 732. In the OFF state 732, the "hands free" faucet 520, FIG. 5A, is activated and provides the user normal use of the "hands free" faucet 520. Initial condition of the conventional faucet 150, FIG. 5A, must be set manually to desired flow rate of "hot water" prior to activating the "hands free" faucet 520.

Figure 8B:
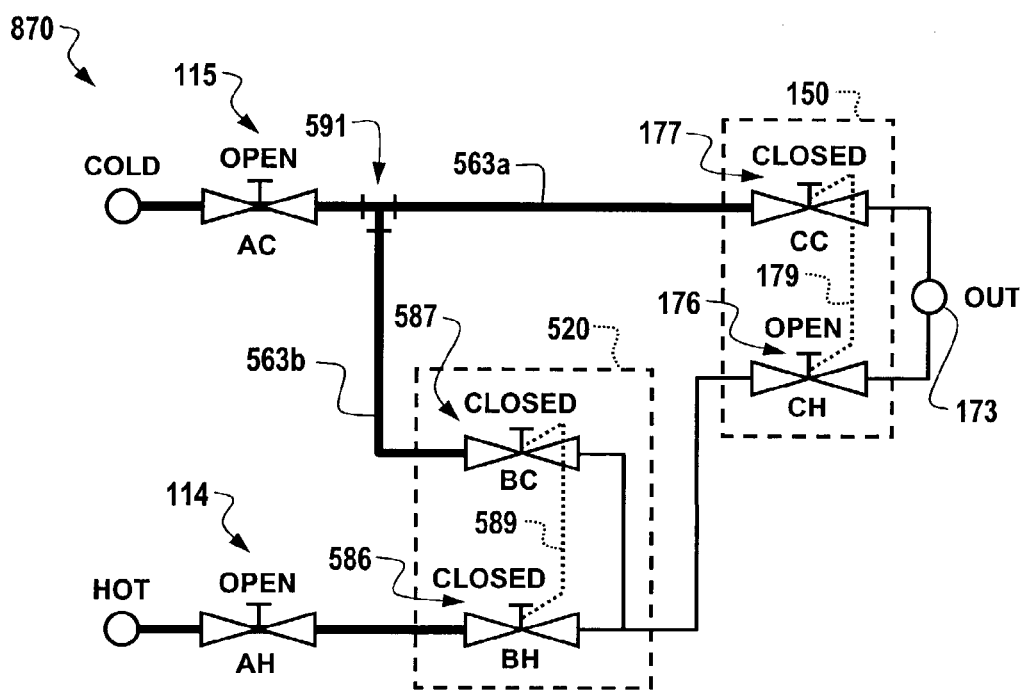
FIG. 8B illustrates a schematic representation of an interconnection of a "single lever" conventional faucet with service shut-off valves and the "hands free" device and further illustrating the presence and logical flow of water in the "OFF" state, in accordance with an embodiment of the present invention.

In operation, reference being made to FIG. 8B, a graphical illustration depicts a schematic representation 870 of the "hands free" faucet 520 set in the OFF state 732, FIG. 8A, engaging control of "hands free" faucet 520. Water valve elements 586 and 587 are positioned in CLOSED states by linkage 589. Supply of HOT water is transferred via shut-off valve 114 and presented to the CLOSED "hot water" valve 586. Initial state of "hot water" valve element 176 is preset to the desired flow rate and outputs via OUT port 173.

Supply of COLD water is transferred via shut-off valve 115 via tee connector 591 that diverts the COLD water supply to line connections 563a and 563b. Line connection 563a provides direct supply of COLD water to "cold water" valve element 177 and terminates at this junction, yet user is allowed to manually control COLD water by means of linkage 179 and cold water valve element 177. Line connection 563b provides direct supply of COLD water and presented to CLOSED "cold water" valve 587.

Figure 9A:
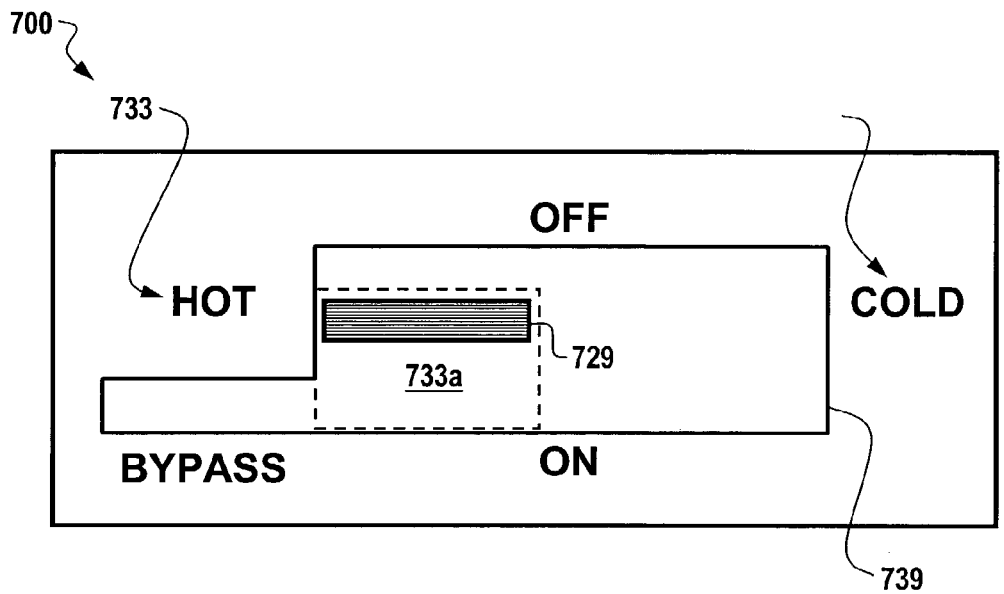
FIG. 9A illustrates a front view of a faceplate of the "hands free" device illustrating a profile of the foot pedal in the "HOT" state position, in accordance with an embodiment of the present invention.

In operation, reference being made to FIG. 9A, a graphical illustration depicts the front view of faceplate 700 of a "hands free" faucet 520, FIG. 5A, with aperture 739 and placement of the foot pedal 729 within the operational zone 733a of the HOT state 733.

Figure 9B:
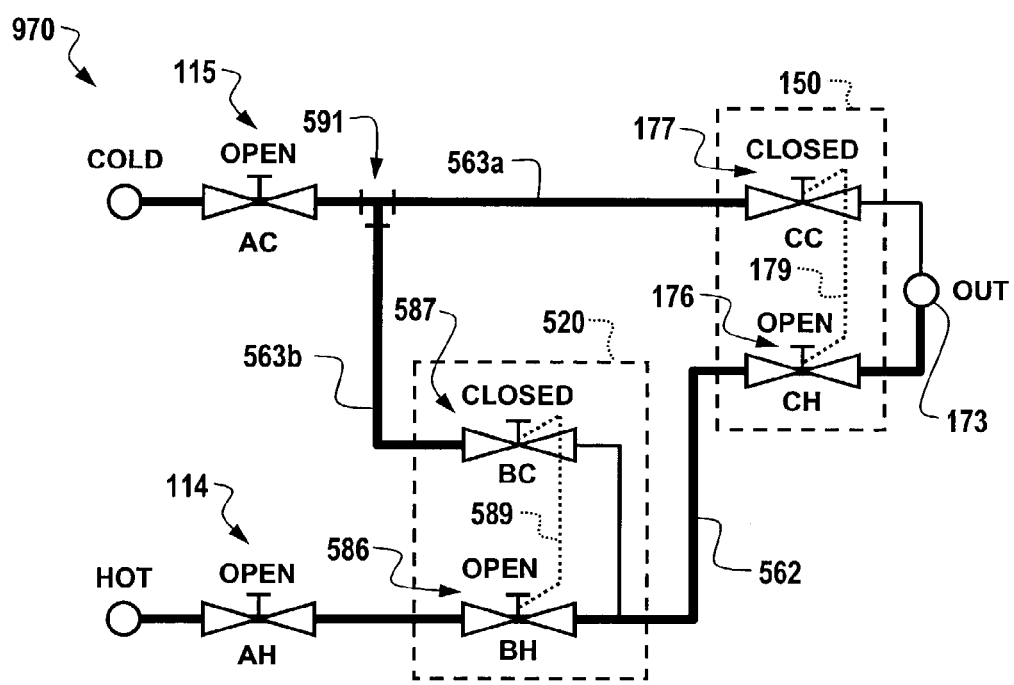
FIG. 9B illustrates a schematic representation of an interconnection of a "single lever" conventional faucet with service shut-off valves and the "hands free" device and further illustrating the presence and logical flow of water in the "HOT" state, in accordance with an embodiment of the present invention.

In operation, reference being made to FIG. 9B, a graphical illustration depicts a schematic representation 970 of the "hands free" faucet 520 set in the HOT state 733, FIG. 9A, allowing normal control of the "hands free" faucet 520 with preset conditions of water valve elements 176 and 177 of "single lever" conventional faucet 150. Desired flow rate is preset by adjustment of valve elements 176 to the OPEN state and 177 to the CLOSED state by linkage 179. Water valve elements 586 and 587 of "hands free" faucet 520 are variably controlled by linkage 589. Supply of HOT water is transferred via shut-off valve 114 and allowed to flow via a fixed OPEN "hot water" valve 586 and transferred via line connection 562 presented to "hot water" valve element 176 and delivered to OUT port 173. Supply of COLD water is transferred via shut-off valve 115 via tee connector 591 that diverts the COLD water supply to line connections 563a and 563b. Line connection 563a provides direct supply of COLD water to "cold water" valve element 177. In the HOT state 731, line connection 563b provides direct supply of COLD water to CLOSED "cold water" valve 587 and terminates at this junction.

Figure 10A:
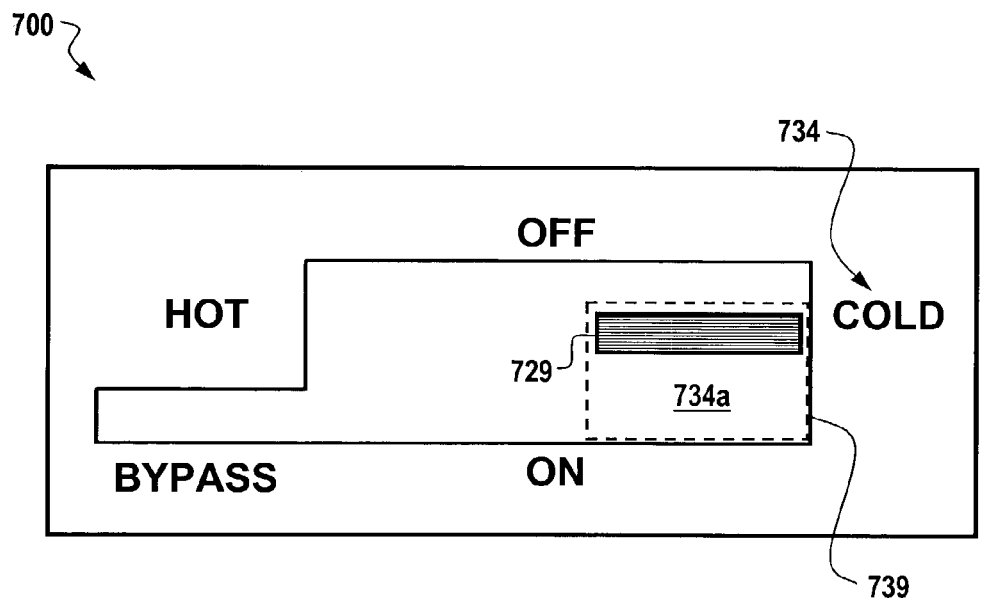
FIG. 10A illustrates a front view of a faceplate of the "hands free" device illustrating a profile of the foot pedal in the "COLD" state position, in accordance with an embodiment of the present invention.

In operation, reference being made to FIG. 10A, a graphical illustration depicts the front view of faceplate 700 of a "hands free" faucet 520, FIG. 5A, with aperture 739 and placement of the foot pedal 729 within the operational zone 734a of the COLD state 734.

Figure 10B:
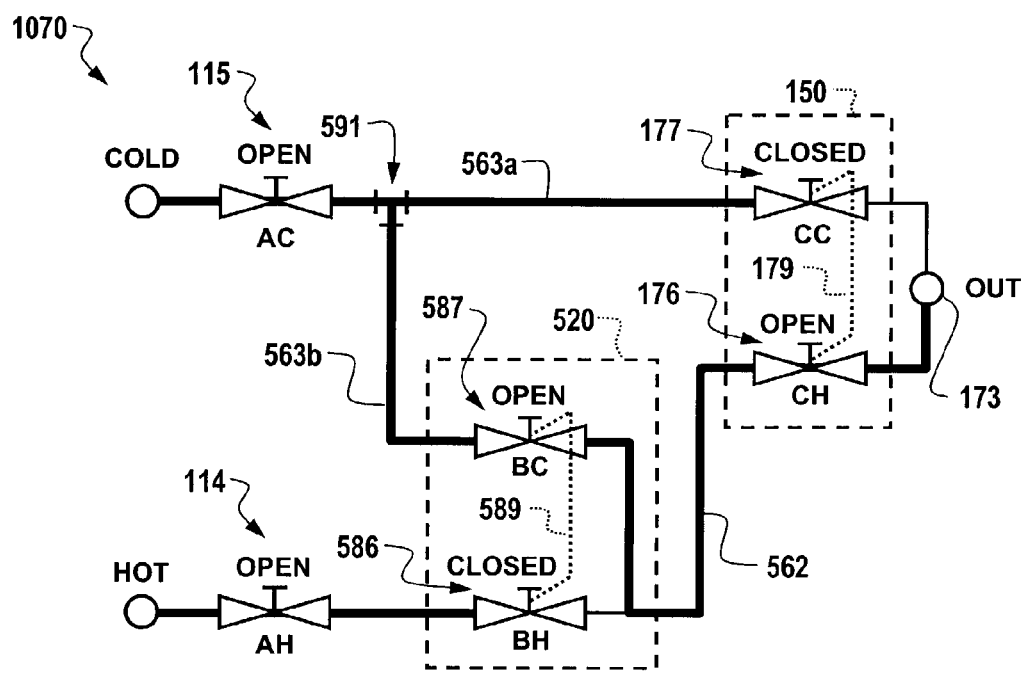
FIG. 10B illustrates a schematic representation of an interconnection of a "single lever" conventional faucet with service shut-off valves and the "hands free" device and further illustrating the presence and logical flow of water in the "COLD" state, in accordance with an embodiment of the present invention.

In operation, reference being made to FIG. 10B, a graphical illustration depicts a schematic representation 1070 of the "hands free" faucet 520 set in the COLD state 734, FIG. 10A, allowing normal control of the "hands free" faucet 520 with preset conditions of water valve elements 176 and 177 of "single lever" conventional faucet 150. Desired flow rate is preset by adjustment of valve elements 176 to the OPEN state and 177 to the CLOSED state by linkage 179 and output via OUT port 173. Water valve elements 586 and 587 are variably controlled by linkage 589. Supply of HOT water is transferred via shut-off valve 114 and supplied to a fixed CLOSED "hot water" valve 586. Supply of COLD water is transferred via shut-off valve 115 via tee connector 591 that diverts the COLD water supply to line connections 563a and 563b. Line connection 563a provides direct supply of COLD water to "cold water" valve element 177. In the COLD state 734, FIG. 10A, line connection 563b allows the supply of COLD water to flow through an OPEN "cold water" valve 587 and delivered to valve element 176 via line connection 562.

Figure 11A:
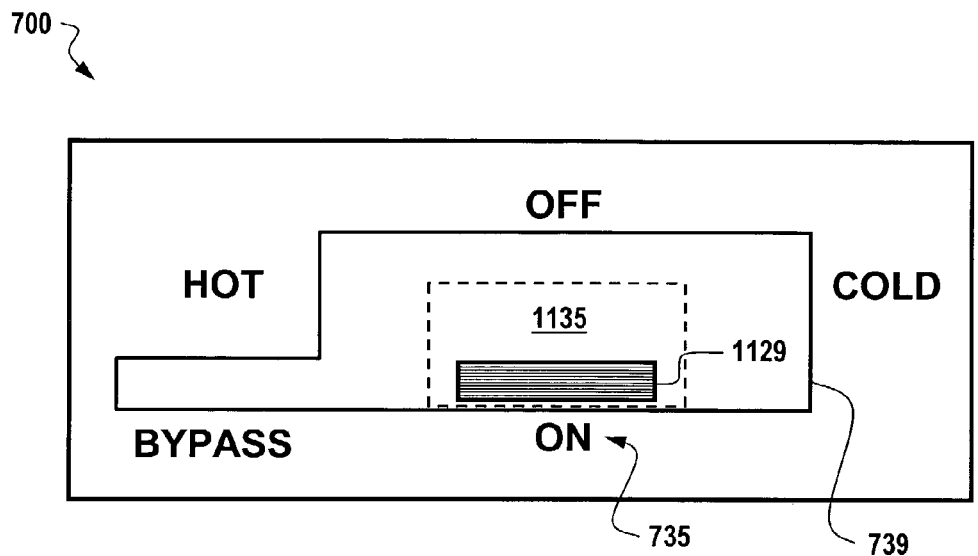
FIG. 11A illustrates a front view of a faceplate of the "hands free" device illustrating a profile of the foot pedal in the "ON" state position, in accordance with an embodiment of the present invention.

In operation, reference being made to FIG. 11A, a graphical illustration depicts the front view of faceplate 700 of a "hands free" faucet 520, FIG. 5A, with aperture 739 and placement of the foot pedal 729 within the operational zone 735a of the ON state 735.

Figure 11B:
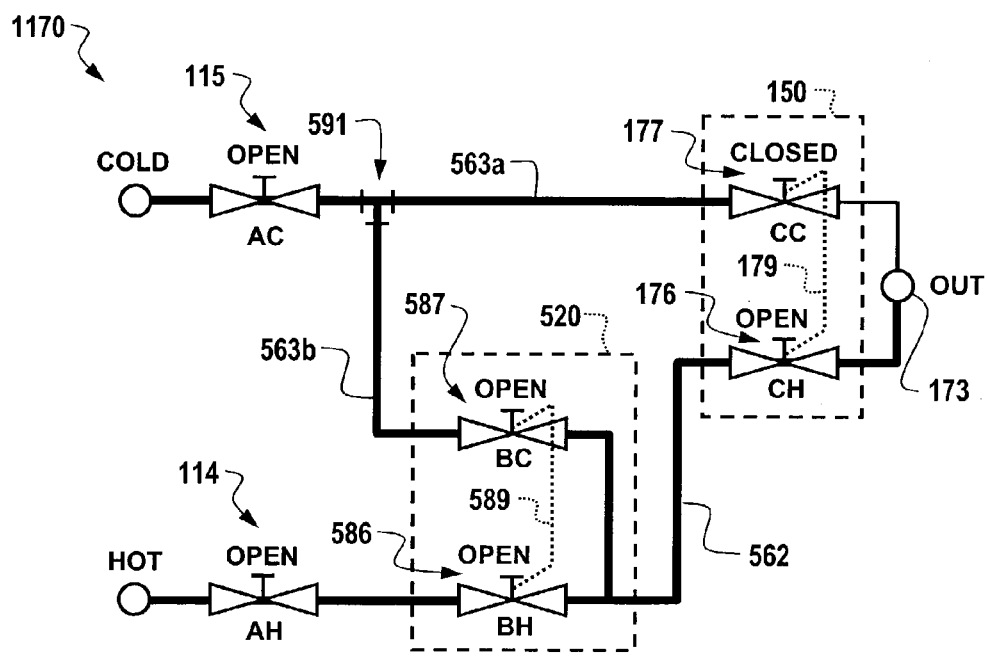
FIG. 11B illustrates a schematic representation of an interconnection of a "single lever" conventional faucet with service shut-off valves and the "hands free" device and further illustrating the presence and logical flow of water in the "ON" state, in accordance with an embodiment of the present invention.

In operation, reference being made to FIG. 11B, a graphical illustration depicts a schematic representation 1170 of the "hands free" faucet 520 set in the ON state 735, FIG. 11A, allowing normal control of "hands free" faucet 520. Water valve elements 586 and 587 are positioned in variable OPEN states by linkage 589. Supply of HOT water is transferred via shut-off valve 114 and presented to the OPEN "hot water" valve 586 and is delivered to the "hot water" valve element 176 via line connection 562. Initial state of "hot water" valve element 176 is preset to the desired flow rate and outputs via OUT port 173. Supply of COLD water is transferred via shut-off valve 115 via tee connector 591 that diverts the COLD water supply to line connections 563a and 563b. Line connection 563a provides direct supply of COLD water to "cold water" valve element 177 and terminates at this junction, yet user is allowed to manually control COLD water by means of linkage 179 and cold water valve element 177. Line connection 563b provides direct supply of COLD water and presented to variably OPEN "cold water" valve 587 and combined and mixed with HOT water supplied by valve element 586.

Referring to FIG. 12A, a graphical illustration depicts an exemplary sectional view of a "hands free" control faucet 1200 housed in fixed base 1251. The "hands free" control faucet 1200 employs a mixing ball valve 1220 of the open type, offering lateral "hot water" inlet 1221 and a "cold water" 1222 that communicate directly with internal passages 1230 and 1232, respectively. The delivery outlet 1223 of mixing ball valve 1220 communicates directly with an output passage 1208 and outputs via the port 1236. Chamber body 1252 covers and retains cam assembly 1215 that guides ball valve stem 1210 and maintains a water seal about mixing ball valve 1220. Alignment of mixing ball valve stem 1210 is in relation to slot 1225 that pivots about a fixed pin 1212 within the chamber body 1252 and allows restricted rotation of the mixing ball valve 1220. Orientation of foot control pedal 1229 is in relation to the alignment of internal drive components of the mixing ball valve 1220 and chamber body 1252. External input port for "hot water" 1234 and "cold water" 1235 interconnect directly with internal passages 1230 and 1232, respectively. Within the internal passages 1230 and 1232, are recessed "hot water" seal assembly 1237 and "cold water" seal assembly 1238 that form a water seal about the mixing ball valve 1220. Integral to the front side of the chamber body 1252 is a cylindrical slot 1262 that support a mechanical coil spring 1261 and buffer pad 1260 that in combination under compression apply a positive force to the normal of the ball valve stem 1210. The mechanical coil spring 1251 serves to reset the "hands free" control faucet 1200 to the OFF state 732, FIG. 7A, during normal operation.

In operation, reference being made to FIG. 12B, a graphical illustration depicts a superposition view 1270 of the mixing ball valve 1220 in the HOT position 732, FIG. 7A. Mixing ball valve 1220 is deflected by a force FH, resisted by the compression force of mechanical spring 1261, and displaces the ball valve stem 1210 from the OFF state centerline 1275 to the HOT state centerline 1276. Mixing ball valve 1220 rotates and pivoting about slot 1225 and fixed pin 1212 aligns "hot water" inlet 1221 and water outlet 1223 to allow HOT water to flow through valve 1220 and delivered to OUT port. Cold water inlet 1222 is positioned in an offset set position closing the path of the COLD water supply.

Referring to FIG. 12C, depicts a superposition view 1280 of the mixing ball valve 1220 in the COLD position 734, FIG. 10A. Mixing ball valve 1220 is deflected by a force FC, resisted by the compression force of mechanical spring 1261, and displaces the ball valve stem 1210 from the OFF state centerline 1275 to the COLD state centerline 1277. Mixing ball valve 1220 rotates and pivoting about slot 1225 and fixed pin 1212 aligns "cold water" inlet 1222 and water outlet 1223 to allow COLD water to flow through ball valve 1220 and delivered to OUT port. Hot water inlet 1221 is positioned in an offset set position closing the path of the HOT water supply.

Figure 13:
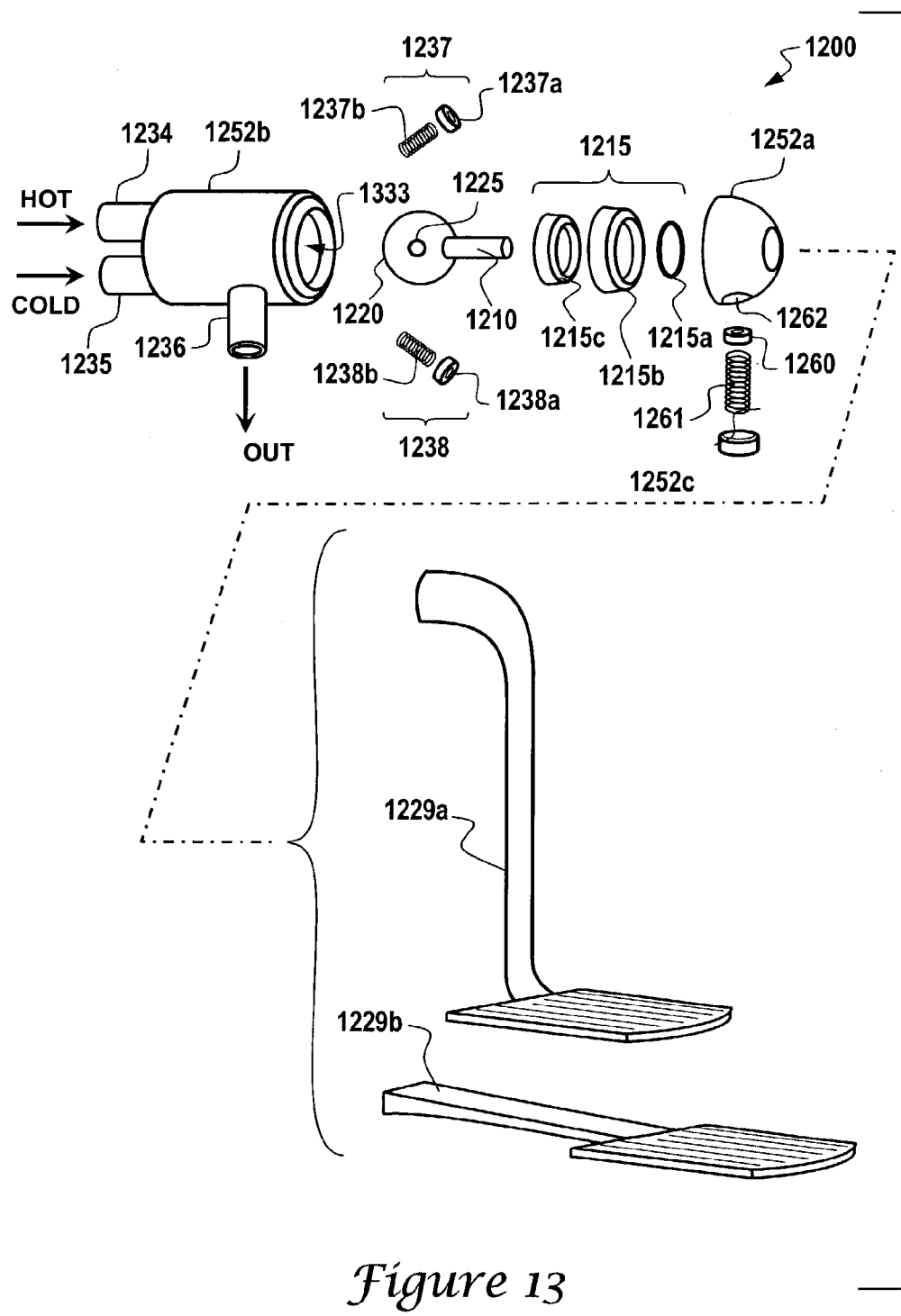
FIG. 13 illustrates an exemplary exploded view of a "hands free" device further illustrating feature capability of adapting foot pedal styles, in accordance with an embodiment of the present invention.

Referring to FIG. 13, a graphical illustration depicts an exemplary exploded view of the critical components of a "hands free" control faucet 1200. The chamber body cover 1252a, the main chamber body 1252b, and coil spring cover 1252c form the housing of components that make-up the function of the "hands free" control faucet 1200. Combination seat 1237a and spring 1237b form the "hot water" seal assembly 1237. Combination seat 1238a and spring 1238b form the "cold water" seal assembly. Both water seal assemblies 1237 and 1238 are installed within the two recessed ports (not shown) within chamber cavity 1333. Chamber cavity 1333 also receives and aligns mixing ball valve 1220 via slot 1225 and fixed pin (not shown) within chamber cavity 1333. The alignment sets orientation of mixing ball stem 1210 with a single control foot pedal 1229a or 1229b. It is understood that on other forms of embodiment, the foot pedal control mechanism and shape of the foot pedal assembly can take on many forms and used with "hands free" control faucet 1200. Cam assembly 1215 consisting of an o-ring seal 1215a, a cam 1215b, and a cam bushing 1215c provide a guide for the mixing ball valve stem 1210 in combination with forming a water seal for the mixing ball valve 1220. Hot and cold water deliveries to the main chamber body 1252b are through external ports 1234 and 1235, respectively. Output passage 1236 delivers resultant water flow and temperature mix to outputs via the OUT port. Integral to the chamber body cover 1252b is a cylindrical slot 1262 that supports a mechanical coil spring 1261 and buffer pad 1260, retained by coil spring cover 1252c that in combination and under compression apply a positive force to the normal of the ball valve stem 1210.

Figure 14A:
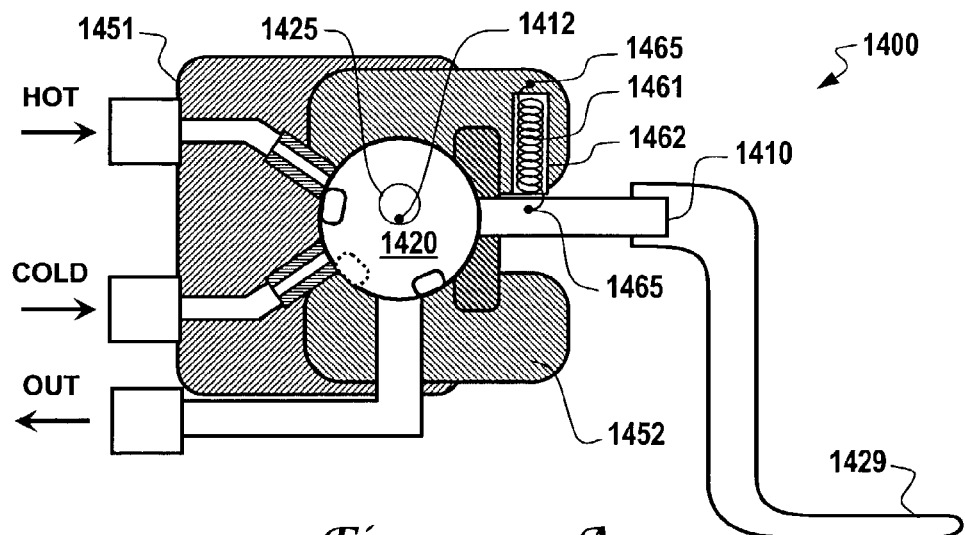
FIG. 14A is an exemplary sectional side view of a "hands free" device in the "OFF" state position and further illustrating a top spring loading of a mechanical reset feature, in accordance with an embodiment of the present invention.

Referring to FIG. 14A, a graphical illustration depicts an exemplary sectional view of a "hands free" control faucet 1400 housed in fixed base 1451. The "hands free" control faucet 1400 employs a mixing ball valve 1420 of the open type. Alignment of mixing ball stem 1410 is in relation to slot 1425 that pivots about a fixed pin 1412 within the chamber body 1452 and allows restricted rotation of the mixing ball valve 1420. Orientation of foot control pedal 1429 is in relation to the alignment of internal drive components of the mixing ball valve 1420 and chamber body 1452. Integral to the front top side of the chamber body 1452 is a cylindrical slot 1462 that supports a mechanical coil spring 1461 that under expansion applies a negative force to the normal of the ball valve stem 1410. Each end of coil spring 1461 attaches to through holes 1465 located on chamber body 1452 and ball valve stem 1410, linking both components. The coil spring 1461 serves to reset the "hands free" control faucet 1400 to the OFF state 732, FIG. 7A, during normal operation.

Figure 14B:
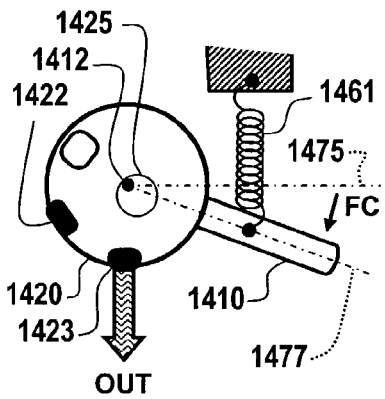
FIG. 14B is an exemplary sectional side view of a mixing ball valve in the "COLD" state position and further illustrating deflection limits of a top spring mechanical reset feature, in accordance with an embodiment of the present invention.

Referring to FIG. 14B, a graphical illustration depicts a superposition side view of the mixing ball valve 1420 in the COLD position 734, FIG. 10A. Mixing ball valve 1420 is deflected by a force FC, resisted by the expansion force of mechanical spring 1461, and displaces the ball valve stem 1410 from the OFF state centerline 1475 to the COLD state centerline 1477. Mixing ball valve 1420 rotates and pivoting about slot 1425 and fixed pin 1412 aligns "cold water" inlet 1422 and water outlet 1423 to allow cold water to flow through ball valve 1420 and delivered to OUT port.

Figure 14C:
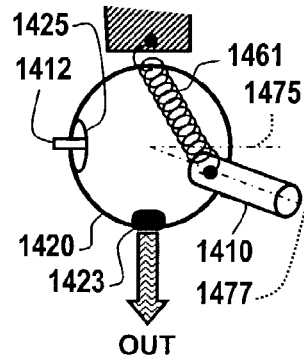
FIG. 14C is an exemplary sectional front view of a mixing ball valve in the "COLD" state position and further illustrating deflection limits of a top spring mechanical reset feature, in accordance with an embodiment of the present invention.

Referring to FIG. 14C, a graphical illustration depicts a superposition front view of the mixing ball valve 1420 in the COLD position 734, FIG. 10A. Mixing ball valve 1420 is deflected and resisted by the expansion force of mechanical spring 1461, and displaces the ball valve stem 1410 from the OFF state centerline 1475 to the COLD state centerline 1477. Mixing ball valve 1420 rotates and pivoting about slot 1425 and fixed pin 1412 aligns "cold water" inlet (not shown) and water outlet 1423 to allow cold water to flow through ball valve 1420 and delivered to OUT port.

Figure 14D:
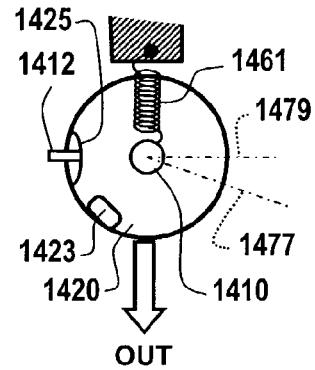
FIG. 14D is an exemplary sectional front view of a mixing ball valve in the "OFF" state position and further illustrating deflection limits of a top spring mechanical reset feature, in accordance with an embodiment of the present invention.

Referring to FIG. 14D, a graphical illustration depicts a superposition front view of the mixing ball valve 1420 in the OFF position 732, FIG. 7A. Mixing ball valve 1420 is reset by the expansion force of mechanical spring 1461, and displaces the ball valve stem 1410 from the COLD state centerline 1477 to the OFF state limit line 1479. Mixing ball valve 1420 rotates and pivoting about slot 1425 and fixed pin 1412 offsets "cold water" inlet (not shown) and water outlet 1423 to block water flow to OUT port.

Figure 14E:
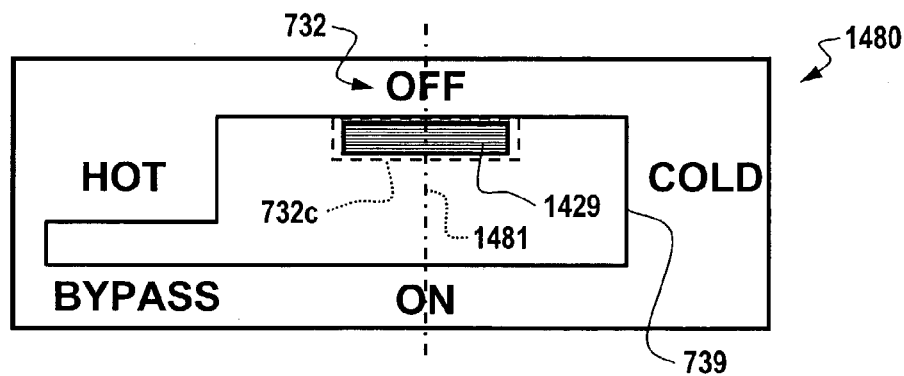
FIG. 14E illustrates a front view of a faceplate of the "hands free" device illustrating a profile of the foot pedal in the "OFF" state position as reset by a top spring, in accordance with an embodiment of the present invention.

In operation, reference being made to FIG. 14E, a graphical illustration depicts the front view of faceplate 1480 of a "hands free" faucet 520, FIG. 5A, with aperture 739 and position of the foot pedal 1429 in the OFF state 732, FIG. 7A, within the reset zone 732c centered with respect to the OFF state vertical centerline 1481. Foot pedal 1429 is forced to the centralized reset zone 1432 by compression force or expansion force exerted by mechanical springs 1261, FIG. 12A, or mechanical spring 1461, FIG. 14A, and upon removal of external force FC, FIGS. 12B and 14B.

Figure 15A:
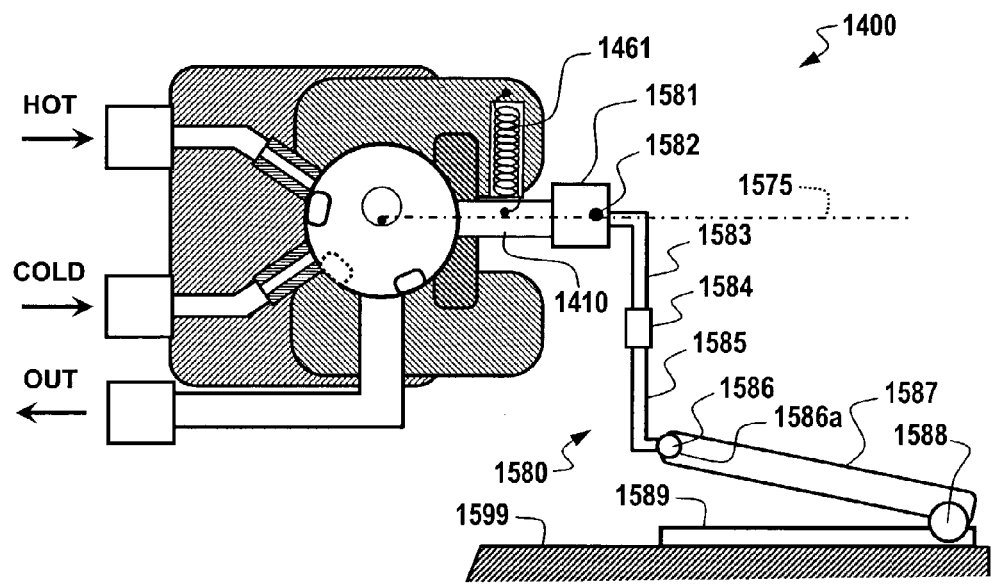
FIG. 15A is an exemplary sectional side view of a "hands free" device in the "OFF" state position and further illustrating a top spring loading of a mechanical reset feature and a foot pedal mechanism, in accordance with an embodiment of the present invention.

Referring to FIG. 15A, a graphical illustration depicts an exemplary sectional view of a "hands free" control faucet 1400 configured with a foot control pedal 1580 in the OFF state position 732, FIG. 7A. Orientation of foot control pedal upper link 1583 is in relation to the alignment of the ball valve stem 1410 and in-line with OFF state horizontal centerline 1575. A mechanical coil spring 1461 that under expansion applies a negative force to the normal of the ball valve stem 1410 is in a relaxed position. Foot control pedal 1580 is attached to ball valve stem 1410 by a coupler 1581 that links upper arm 1583 via swivel pin 1582. Upper arm 1583 is capable of sliding into lower arm tubing 1585 for the purpose of adjusting the length of the overall linkage. Coupler 1584 serves to secure and fasten in place upper arm 1583 and lower arm 1585. Bottom end of lower arm 1585 forms a spherical ball joint 1586 that fits circumferentially within a ball socket 1586a centrally located on the rear edge of the foot pedal 1587. Centrally located along the front side of foot pedal 1587 a spherical ball joint 1588 is positioned between the foot pedal 1587 and base 1589 that rests on surface 1599.

Figure 15B:
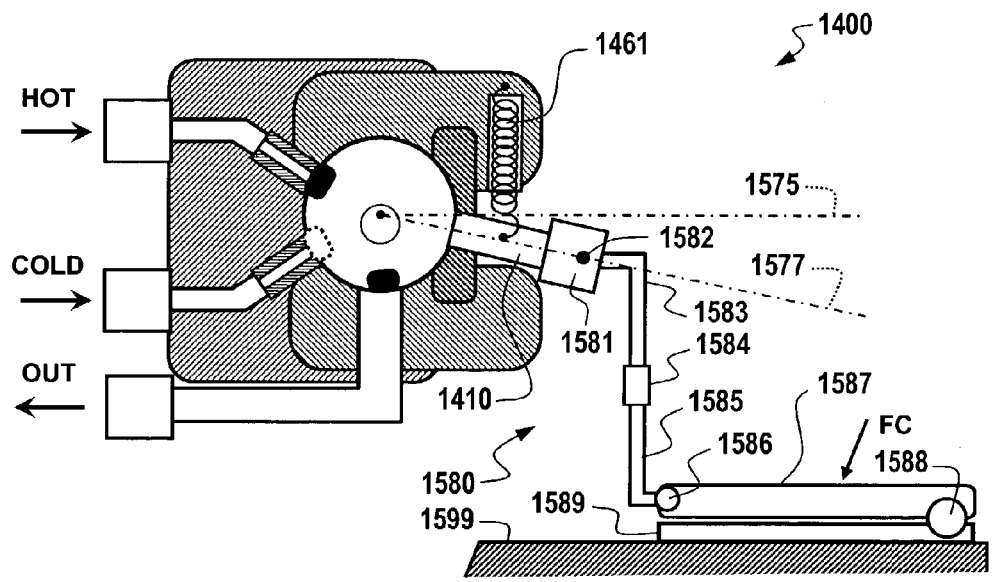
FIG. 15B is an exemplary sectional side view of a "hands free" device in the "ON" state position and further illustrating deflection of a top spring loading of a mechanical reset feature and a foot pedal mechanism, in accordance with an embodiment of the present invention.

In operation, reference being made to FIG. 15B, a graphical illustration depicts an exemplary sectional view of a "hands free" control faucet 1400 configured with a foot control pedal 1580 in the COLD state 734, FIG. 10A. External force FC applied to control pedal 1580 deflects attached ball valve stem 1410 and activates "hands free" control faucet 1400. Transfer of external force FC applied to foot pedal control 1580 translates to the lateral and vertical pivoting of the foot pedal 1587 about spherical ball joint 1588 that links the foot pedal 1587 and base 1589 resting on surface 1599. Upper and lower arms 1583 and 1585 along with associated coupler 1584 pivot about a spherical ball joint 1586, centrally located on the rear edge of the foot pedal 1587. Mechanical coil spring 1461 is under expansion by external force FC and applies a negative force to the normal of the ball valve stem 1410. In the COLD state, upper arm 1583 swivels about swivel pin 1582 and coupler 1581 resulting in the deflection of valve stem 1410. Orientation of the ball valve stem 1410 is offset from an OFF state centerline position 1575 and is positioned with alignment coinciding with ON state centerline position 1577.

Figure 16A:
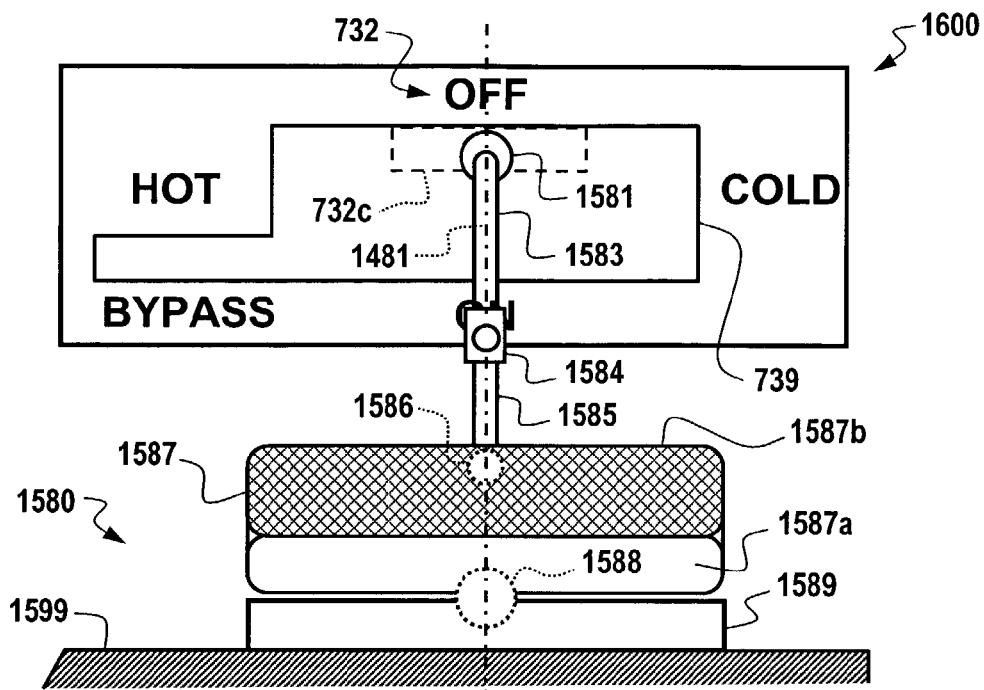
FIG. 16A illustrates a front view of a faceplate of the "hands free" device illustrating and of the foot pedal in the "OFF" state position as reset by a top spring, in accordance with an embodiment of the present invention.

In operation, reference being made to FIG. 16A, a graphical illustration depicts a front view of faceplate 1600 of a "hands free" faucet 520, FIG. 5A, and a foot pedal control 1580 in an OFF state 732, FIG. 7A. Faceplate 1600 with aperture 739 and position of the foot pedal 1587 is centered with respect to the OFF state vertical centerline 1481 and within the reset zone 732c of the OFF state 732. Orientation of upper coupler 1581, upper arm 1583, lower arm 1585, and arm coupler 1584 are aligned in relation to the ball valve stem (not shown) and in-line with OFF state centerline 1481. Bottom end of lower arm 1585 forms a spherical ball joint 1586 centrally located on the rear edge 1587b of the foot pedal 1587 and shown raised relative to front side 1587a. Recessed and centrally located along the pedal front side 1587a, a spherical ball joint 1588 is positioned between the foot pedal 1587 and base 1589 that rests on surface 1599.

Figure 16B:
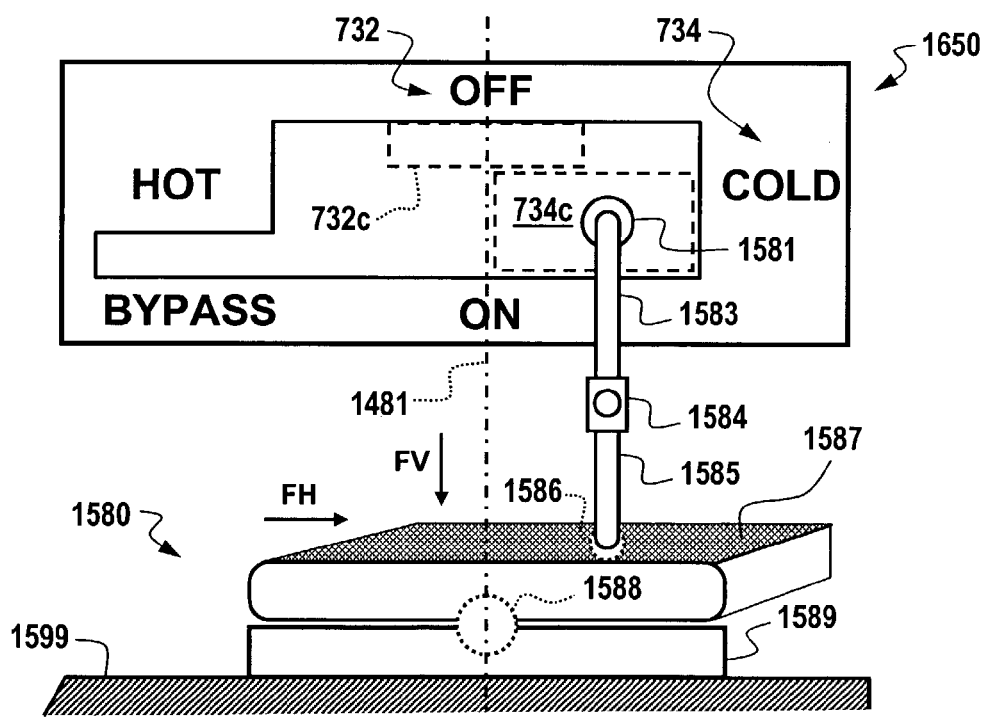
FIG. 16B illustrates a front view of a faceplate of the "hands free" device illustrating and of the foot pedal in the "ON" state position, in accordance with an embodiment of the present invention.

In operation, reference being made to FIG. 16B, a graphical illustration depicts an exemplary front view faceplate 1650 of a "hands free" faucet 520, FIG. 5A, and a foot pedal control 1580 in a COLD state 734. The combination of external horizontal force FH and vertical force FV applied to foot pedal control 1580 deflects attached ball valve stem (not shown) and activates "hands free" control faucet 1400, FIG. 15B. Transfer of external forces FH and FV applied to foot pedal control 1580 translates to the lateral and vertical pivoting of the foot pedal 1587 about spherical ball joint 1588 that links the foot pedal 1587 and base 1589 that rests on surface 1599. Position of spherical ball joint 1588 is central to OFF state vertical centerline 1481. Upper and lower arms 1583 and 1585 along with associated coupler 1584 pivot about a spherical ball joint 1586, centrally located on the rear edge of the foot pedal 1587. In the COLD state, upper arm 1583 swivels about swivel pin (not shown) and coupler 1581 resulting in the deflection of valve stem (not shown). Orientation of the ball valve stem (not shown) and coupler 1581 are offset from an OFF state 732 and outside zone 732c to the present ON state position 734 and within ON state zone 734c.

Figure 17:
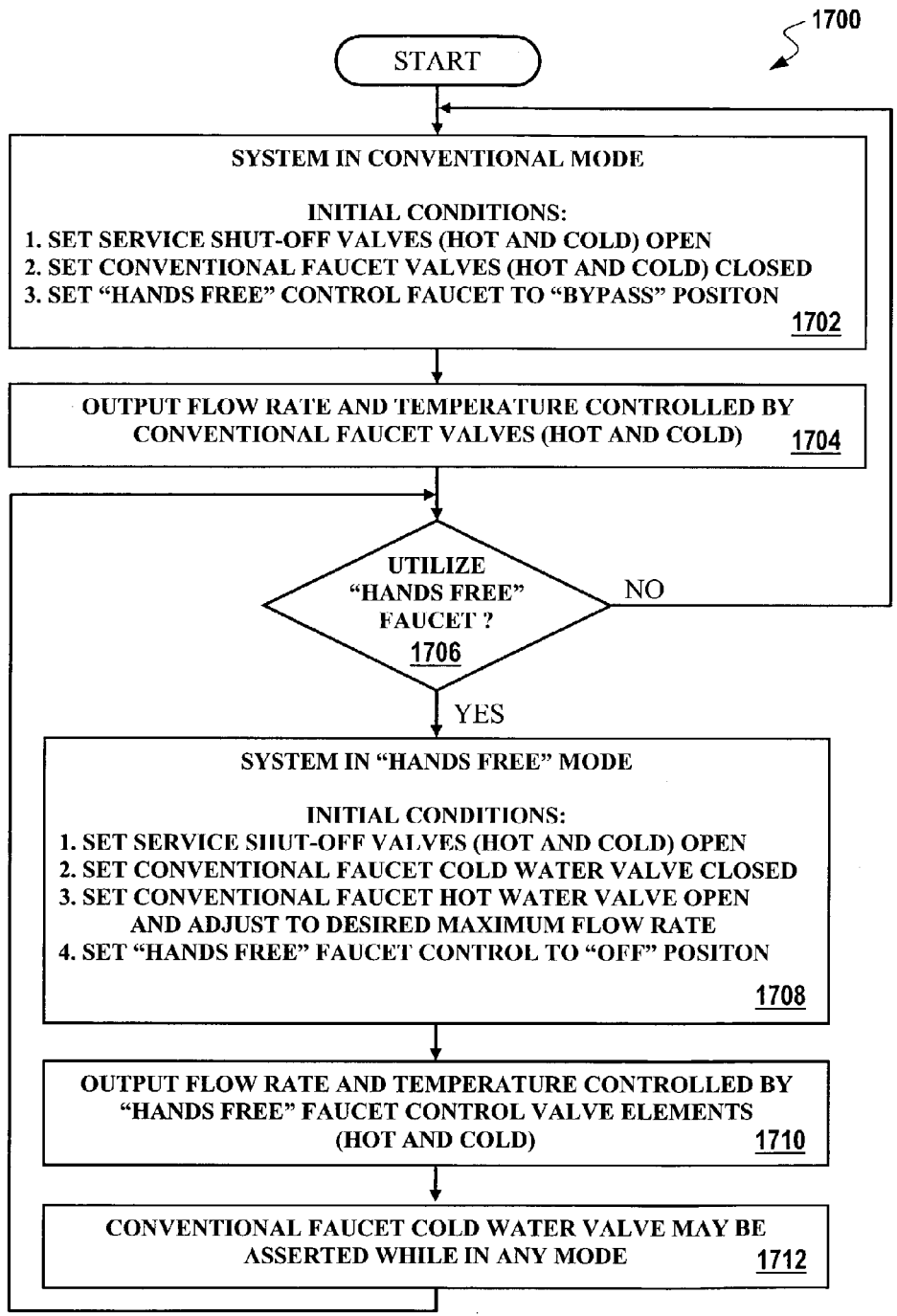
FIG. 17 illustrates a block diagram of a system that can be used to carry out the methods of configuring the present invention.

Referring to FIG. 17, illustrates a block diagram 1700 of a system that can be used to carry out the methods of configuring a "hands free" faucet 520, FIG. 5A, as described above. A "hands free" faucet system 520, FIG. 5A, comprises of the following two modes: "System in Conventional Mode" 1702 and "System in Hands Free Mode" 1708. Procedure for the configuration of a "hands free" faucet control system 520, FIG. 5A, consists of a closed loop system sequence that allows ease of switching between modes 1702 and 1708. For purposes of illustration, block diagram 1700 assumes the initial system configuration to be at the block "System in Conventional Mode" 1702 and starts at this point.

As specified in the system block "System in Hands Free Mode" 1708, stipulates the initial conditions of control elements and components of a "hands free" faucet control system 520, FIG. 5A:

1. Set Hot and Cold Water Service Shut-Off Valves to an OPEN State
2. Set Conventional Faucet Hot and Cold Water Valves to a CLOSED State
3. Set the Hands Free Faucet Control to BYPASS State Subsequent to the initiation of conditions outlined in system block "System in Conventional Mode" 1702 is the system operational condition that disengages the "hands free" faucet control 520, FIG. 5A. As specified in the system block 1704, the user is allowed to control the flow rate and temperature mix of the output by manual control of the conventional faucet valves.

As indicated thereafter at decision block 1706, the user makes the determination to either continue with the "System in Conventional Mode" 1702 or proceed with "System in Hands Free Mode" 1708. As specified in the system block "System in Hands Free Mode" 1708, stipulates the initial conditions of control elements and components of a "hands free" faucet system 520, FIG. 5A:

1. Set Hot and Cold Water Service Shut-Off Valves to an OPEN State
2. Set Conventional Faucet Cold Water Valve to a CLOSED State
3. Set Conventional Faucet Hot Water Valve to an OPEN State and Adjust to Desired Maximum Flow Rate
4. Set Hands Free Faucet Control to OFF State Subsequent to the initiation of conditions outlined in system block "System in Hands Free Mode" 1708 is the system operational condition that engages the "hands free" faucet control 520, FIG. 5A. As specified in the system block 1710, the user is allowed to control the flow rate and temperature mix of the output by control of the "hands free" faucet control 520, FIG. 5A. As a system feature, the capability of asserting the cold water valve of a conventional faucet, as indicated in system block 1712, is an option in either mode of operation 1702 and 1708.

The embodiment and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A hands free water system, comprising:
    a sealed chamber body adapted for containing a mixing ball valve and having chamber ports further serving as internal passages to channels adapted to said sealed chamber body for connection to water line tubing, said sealed chamber body and associated output channels featuring standard plumbing connections that enable interface to pre-existing plumbing fixtures;
    a mixing ball valve substantially retained within said sealed chamber body and having delivery and exit ports through which water can enter and exit the mixing ball valve, wherein said mixing is adapted for rotation in relation to the fixed chamber body for selective alignment with said chamber ports and wherein said mixing ball further comprises a keyed slot limiting rotation of said mixing ball valve by a corresponding fixed orientation pin included within an inner cavity of the sealed chamber body;
    a foot controllable actuator in operational connection with said mixing ball valve, wherein a faucet system user can cause rotation of said mixing ball valve with said foot controllable actuator to control water flow rate and temperature; and
    a control state module adapted to guide said foot controllable actuator into at least one operation state at a time, said operation state including: "BYPASS", "OFF", "ON", "HOT", or "COLD", wherein the user can engage the "hands free" device by foot-switching the system to or from the "BYPASS" state to or from any of the "OFF", "ON", "HOT", or "COLD" states using said foot controllable actuator;
    wherein the "BYPASS" state causes placement of the mixing ball valve's orientation in the maximum flow rate of hot water; and
    wherein output from the sealed chamber body and mixing ball valve is in an in-line supply or series arrangement with corresponding conventional faucet "hot water" control valving, wherein assertion of the "hands free" device in the "BYPASS" state provides a single source of supply of hot water to the conventional faucet.

2. The system of claim 1, wherein standard plumbing interconnections associated with said channels allow cold and hot water supplies enter the mixing ball valve via the internal passages and ports within the chamber body and enter the ball valve via entrance ports on the ball valve.

3. The system of claim 1, wherein said foot controllable actuator further comprises a foot pedal, wherein said foot pedal allows said faucet user to facilitate control and regulation of the rotating mixing ball valve.

4. The system of claim 3, wherein said foot pedal includes extension to a fixed lever that is further attached to the ball valve and extends said foot pedal to the user near a floor associated with the system.

5. The system of claim 1 wherein cold water is in a constant supply or parallel arrangement to an input channel of the sealed chamber body and corresponding conventional faucet "cold water" control valving, wherein the "BYPASS" state enables the user full "hand operated" control of water faucet output via conventional faucet control valves.

6. The system of claim 1, wherein said sealed chamber body and associated output channel features standard plumbing connections that enable interface to pre-existing plumbing fixtures.

7. A hands free water system, comprising:
    a hand free control mechanism adapted for user foot control and further adapted for use with pre-existing plumbing and fixtures, said hand free water system including control state module for providing a user with BYPASS, ON, OFF, HOT and COLD modes of operation; and
    a sealed chamber body adapted for containing a mixing ball valve and having chamber ports further serving as internal passages to channels adapted to said sealed chamber body for connection to water line tubing; a mixing ball valve substantially retained within said sealed chamber body and having delivery and exit ports through which water can enter and exit the mixing ball valve, wherein said mixing is adapted for rotation in relation to the fixed chamber body for selective alignment with said chamber ports and wherein said mixing ball further comprises a keyed slot limiting rotation of said mixing ball valve by a corresponding fixed orientation pin included within an inner cavity of the sealed chamber body; and a foot controllable actuator in operational connection with said mixing ball valve, wherein a faucet system user can cause rotation of said mixing ball valve with said foot controllable actuator to control water flow rate and temperature;

wherein output from the sealed chamber body and mixing ball valve is in an in-line supply or series arrangement with corresponding conventional faucet "hot water" control valving, wherein the "BYPASS" mode the hands free water system provides a single source of supply of hot water to the conventional faucet.

8. The system of claim 7, wherein standard plumbing interconnections associated with said channels allow cold and hot water supplies enter the mixing ball valve via the internal passages and ports within the chamber body and enter the ball valve via entrance ports on the ball valve.

9. The system of claim 7, wherein said foot controllable actuator further comprises a foot pedal, wherein said foot pedal allows said faucet user to facilitate control and regulation of the rotating mixing ball valve.

10. The system of claim 9, wherein said foot pedal includes extension to a fixed lever that is further attached to the ball valve and extends said foot pedal to the user near a floor associated with the system.

11. The system of claim 7, wherein said sealed chamber body and associated output channel features standard plumbing connections that enable interface to pre-existing plumbing fixtures.

12. The system of claim 7 wherein the "BYPASS" state causes placement of the mixing ball valve's orientation in the maximum flow rate of hot water.

13. The system of claim 7 wherein cold water is in a constant supply or parallel arrangement to an input channel of the sealed chamber body and corresponding conventional faucet "cold water" control valving, wherein the "BYPASS" state enables the user full "hand operated" control of water faucet output via conventional faucet control valves.

* * * * *